(12) United States Patent
Lam et al.

(10) Patent No.: US 10,985,644 B1
(45) Date of Patent: Apr. 20, 2021

(54) OPTIMIZED GATE DRIVER FOR LOW VOLTAGE POWER LOSS PROTECTION SYSTEM

(71) Applicant: Active-Semi, Inc., Tortola (VG)

(72) Inventors: Thuc Huu Lam, Nghe An Province (VN); Khanh Quang Dinh, Hung Yen Province (VN); Tung Van Nguyen, Nam Dinh Province (VN); Hue Khac Trinh, Hanoi (VN)

(73) Assignee: Active-Semi, Inc., Tortola (VG)

( * ) Notice: Subject to any disclaimer, the term of this patent is extended or adjusted under 35 U.S.C. 154(b) by 180 days.

(21) Appl. No.: 15/633,662

(22) Filed: Jun. 26, 2017

Related U.S. Application Data

(60) Provisional application No. 62/354,740, filed on Jun. 25, 2016.

(51) Int. Cl.
| | | |
|---|---|---|
| *H02M 1/08* | (2006.01) | |
| *H02M 1/32* | (2007.01) | |
| *H02M 3/158* | (2006.01) | |
| *H02J 9/06* | (2006.01) | |
| *H02M 3/155* | (2006.01) | |
| *H02M 1/00* | (2006.01) | |

(52) U.S. Cl.
CPC ............... *H02M 1/08* (2013.01); *H02J 9/061* (2013.01); *H02M 1/32* (2013.01); *H02M 3/155* (2013.01); *H02M 3/1582* (2013.01); *H02M 2001/0045* (2013.01); *H02M 2001/0096* (2013.01)

(58) Field of Classification Search
CPC . H02M 2001/0006; H02M 2001/0032; H02M 1/08; H02M 1/36; H02M 3/1582; H02M 3/1588
See application file for complete search history.

(56) References Cited

U.S. PATENT DOCUMENTS

| | | |
|---|---|---|
| 5,781,045 A | 7/1998 | Walia et al. |
| 5,896,059 A | 4/1999 | McCall et al. |

(Continued)

OTHER PUBLICATIONS

Notice of Allowance for U.S. Appl. No. 15/466,681, dated Feb. 15, 2018, 8 pages.

(Continued)

*Primary Examiner* — Fred E Finch, III
*Assistant Examiner* — Rafael O. De León Domenech
(74) *Attorney, Agent, or Firm* — Withrow & Terranova, P.L.L.C.

(57) ABSTRACT

An integrated circuit (IC) comprises a regulator circuit, a bootstrap control circuit, and a gate driver that drives a transistor pair in buck or boost mode to switch current through an inductor. The IC has a VIN terminal coupled to receive a voltage generated from an AC power source, a STR terminal coupled to receive a voltage from a stored power source (e.g., a capacitor bank), and a HSB terminal that is capacitively coupled to the inductor. When bucking or boosting, the regulator circuit generates VDD supply voltage from the stored power source, supplies the VDD supply voltage onto the bootstrap control circuit, and the bootstrap control circuit generates a gate driver supply voltage that is supplied to the gate driver circuit. When not bucking or boosting, voltage on the HSB terminal is maintained between a voltage threshold from the AC power source without draining the stored power source.

15 Claims, 18 Drawing Sheets

(56) References Cited

U.S. PATENT DOCUMENTS

| | | |
|---|---|---|
| 5,955,914 A | 9/1999 | Su et al. |
| 6,107,844 A | 8/2000 | Berg et al. |
| 6,618,235 B1 | 9/2003 | Wagoner et al. |
| 6,819,149 B2 | 11/2004 | Shirasawa et al. |
| 7,141,957 B2 | 11/2006 | Tolle et al. |
| 7,382,116 B2 | 6/2008 | Endo et al. |
| 7,450,354 B2 | 11/2008 | Tain et al. |
| 7,489,166 B2 | 2/2009 | Honda |
| 7,504,746 B2 | 3/2009 | Wong et al. |
| 7,710,187 B2 | 5/2010 | Hiyama |
| 7,852,060 B2 | 12/2010 | Omet et al. |
| 7,940,092 B2 | 5/2011 | Zheng et al. |
| 8,067,925 B2 | 11/2011 | Grimm |
| 8,370,659 B2 | 2/2013 | Chiasson et al. |
| 8,441,265 B2 | 5/2013 | Paulsen et al. |
| 8,441,306 B2 | 5/2013 | Chen et al. |
| 8,479,032 B2 | 7/2013 | Trantham et al. |
| 8,607,076 B2 | 12/2013 | Lester et al. |
| 9,077,175 B2 | 7/2015 | Su et al. |
| 9,097,747 B2 | 8/2015 | Ikeda et al. |
| 9,268,391 B2 | 2/2016 | Cahill-O'Brien et al. |
| 9,389,263 B2 | 7/2016 | Sartler et al. |
| 9,461,457 B2 | 10/2016 | Fukuta et al. |
| 9,490,663 B1 | 11/2016 | Kim et al. |
| 9,561,792 B2 | 2/2017 | Kodawara |
| 9,583,794 B2 | 2/2017 | Adrian et al. |
| 9,705,402 B1 | 7/2017 | Carpenter, Jr. et al. |
| 9,740,258 B2 | 8/2017 | Morning-Smith et al. |
| 9,946,279 B1 | 4/2018 | Dinh et al. |
| 10,020,723 B1 | 7/2018 | Carpenter et al. |
| 10,090,675 B1 | 10/2018 | Lam et al. |
| 10,110,125 B2 | 10/2018 | Hung et al. |
| 10,270,239 B2 | 4/2019 | Bahl |
| 2008/0169791 A1 | 7/2008 | Daio |
| 2009/0002054 A1 | 1/2009 | Tsunoda et al. |
| 2009/0200982 A1 | 8/2009 | Hurtz |
| 2010/0123485 A1 | 5/2010 | Lee |
| 2010/0141326 A1 | 6/2010 | Tumminaro et al. |
| 2010/0246224 A1 | 9/2010 | Zhang et al. |
| 2010/0277142 A1 | 11/2010 | Tan et al. |
| 2012/0049829 A1 | 3/2012 | Murakami |
| 2012/0056484 A1 | 3/2012 | Mumtaz |
| 2012/0139500 A1 | 6/2012 | Ye et al. |
| 2012/0213014 A1 | 8/2012 | Koyashiki et al. |
| 2013/0038140 A1 | 2/2013 | Seki et al. |
| 2013/0038273 A1 | 2/2013 | Riggio et al. |
| 2013/0038307 A1 | 2/2013 | Saito et al. |
| 2013/0088203 A1 | 4/2013 | Solie |
| 2013/0214823 A1 | 8/2013 | Kawamoto et al. |
| 2013/0221926 A1 | 8/2013 | Furtner |
| 2015/0042292 A1* | 2/2015 | Mao .................. H02J 7/045 320/162 |
| 2015/0155783 A1 | 6/2015 | Li et al. |
| 2015/0263600 A1 | 9/2015 | Bhandarkar et al. |
| 2015/0303799 A1* | 10/2015 | Tang .................. H02M 3/158 323/271 |
| 2016/0065072 A1* | 3/2016 | Xiu .................. H02M 1/08 323/271 |
| 2016/0072403 A1 | 3/2016 | Niwa |
| 2016/0082946 A1 | 3/2016 | Kodawara |
| 2016/0105175 A1 | 4/2016 | Ishimatsu et al. |
| 2016/0141907 A1 | 5/2016 | Mulawski |
| 2016/0274172 A1 | 9/2016 | Yoshida |
| 2016/0307086 A1 | 10/2016 | Nozoe |
| 2017/0059658 A1 | 3/2017 | Tanaka |
| 2017/0125995 A1 | 5/2017 | Nisi et al. |
| 2017/0126973 A1 | 5/2017 | Skeoch |
| 2017/0163088 A1 | 6/2017 | Toyoda |
| 2017/0201100 A1 | 7/2017 | Mumtaz |
| 2017/0324411 A1* | 11/2017 | Gong .................. H02M 3/07 |
| 2017/0346335 A1 | 11/2017 | Chen et al. |
| 2018/0069394 A1 | 3/2018 | Hagen et al. |
| 2018/0074564 A1 | 3/2018 | Paparrizos et al. |
| 2018/0275735 A1 | 9/2018 | Katou |
| 2018/0323699 A1 | 11/2018 | Carpenter, Jr. et al. |
| 2019/0041938 A1 | 2/2019 | Zupanc et al. |

OTHER PUBLICATIONS

Non-Final Office Action for U.S. Appl. No. 15/476,977, dated Jan. 12, 2018, 14 pages.
Notice of Allowance and Examiner-Initiated Interview Summary for U.S. Appl. No. 15/476,977, dated May 22, 2018, 12 pages.
Non-Final Office Action for U.S. Appl. No. 16/051,475, dated Feb. 5, 2019, 16 pages.
Final Office Action for U.S. Appl. No. 16/051,475, dated Aug. 19, 2019, 15 pages.
Notice of Allowance and Examiner-Initiated Interview Summary for U.S. Appl. No. 16/051,475, dated Oct. 22, 2019, 9 pages.
Non-Final Office Action for U.S. Appl. No. 15/640,505, dated Aug. 7, 2018, 14 pages.
Final Office Action for U.S. Appl. No. 15/640,505, dated Feb. 19, 2019, 9 pages.
Notice of Allowance for U.S. Appl. No. 15/640,505, dated Sep. 5, 2019, 9 pages.
Non-Final Office Action for U.S. Appl. No. 16/030,865, dated Sep. 5, 2019, 15 pages.
Final Office Action for U.S. Appl. No. 16/030,865, dated Nov. 26, 2019, 11 pages.
Advisory Action for U.S. Appl. No. 16/030,865, dated Jan. 29, 2020, 3 pages.
Notice of Allowance for U.S. Appl. No. 16/030,865, dated Feb. 21, 2020, 8 pages.
Notice of Allowance for U.S. Appl. No. 16/051,475, dated Mar. 2, 2020, 8 pages.
Notice of Allowance for U.S. Appl. No. 16/051,475, dated Apr. 21, 2020, 8 pages.
Notice of Allowance for U.S. Appl. No. 16/931,066, dated Sep. 14, 2020, 8 pages.

* cited by examiner

COMPARE-AND-MASK CIRCUIT

DAC AND COMPARE CIRCUIT

STATE DIAGRAM FOR THE CAPACITOR HEALTH
MONITOR STATE MACHINE

| TSET[3:0] | MILLISECONDS |
|---|---|
| 0000 | 2 |
| 0001 | 4 |
| 0010 | 8 |
| 0011 | 16 |
| 0100 | 32 |
| 0101 | 64 |
| 0110 | 128 |
| 0111 | 256 |
| 1000 | 384 |
| 1001 | 512 |
| 1010 | 640 |
| 1011 | 768 |
| 1100 | 896 |
| 1101 | 1024 |
| 1110 | 1152 |
| 1111 | 1280 |

TSET LOOKUP TABLE

CAPACITOR HEALTH CHECK

SWITCHING CONVERTER CONTROL CIRCUIT

VOLTAGE REFERENCE CIRCUIT

I2C INTERFACE AND DIGITAL REGISTER CONTROL AND DIGITAL STATE MACHINE

LINEAR REGULATOR (LDO) CIRCUIT

OPERATION OF LINEAR REGULATOR CIRCUIT OF FIG. 14

BOOTSTRAP CONTROL CIRCUIT

LINEAR REGULATOR CIRCUIT
(ANOTHER EMBODIMENT)

OPERATION OF LINEAR REGULATOR CIRCUIT OF FIG. 19
(ANOTHER EMBODIMENT)

US 10,985,644 B1

OPTIMIZED GATE DRIVER FOR LOW VOLTAGE POWER LOSS PROTECTION SYSTEM

CROSS-REFERENCE TO RELATED APPLICATION

This application claims the benefit under 35 U.S.C. § 119 of provisional application Ser. No. 62/354,740, entitled "Optimized Gate Driver For Low Voltage Power Loss Protection System", filed Jun. 25, 2016. The entirety of provisional application Ser. No. 62/354,740 is incorporated herein by reference.

TECHNICAL FIELD

The present disclosure relates generally power loss protection circuits and to related methods.

BACKGROUND INFORMATION

Capacitors and/or batteries are used to store energy in power loss protection systems. FIG. 1 (Prior Art) illustrates one example of a power loss protection system 100 for powering a device. The power loss protection system 100 involves a so-called "eFuse" 101, a switch component 102, enable trip point resistors 103 and 104, a boost converter circuit 105, a bank of capacitors and/or batteries 106, and a voltage regulator 107. This circuitry is soldered onto a printed circuit board. During normal operation of the power loss protection system, when the system is powering the device, the boost converter 105 receives some of the power from the eFuse output and uses that to charge the capacitors and/or batteries 106. If VIN at input 109 is then suddenly lost, for example due to a condition like a power brown out condition or a power cord disconnection event, then the eFuse turns off immediately and the fault signal is asserted. The fault signal is received by the second switch SW2 102. The second switch SW2 102 responds by turning on so that power can then be supplied onto node 108 from the capacitors and/or batteries 106 in the place of the lost power. The linear voltage regulator 107 reduces the capacitor voltage down to the supply voltage "VSYS" required by the device being powered. The required system power and supply voltage VSYS can therefore be maintained for long enough to allow data that is stored in the device in volatile memory to be transferred into non-volatile storage before system power is lost altogether. This kind of prior art power loss protection system is used to power devices where high reliability is required, such as in computers like laptops and servers. If capacitors are used for block 106, then the capacitance of the capacitors must be large enough that the energy stored in the capacitors can sustain system power long enough to allow the device to complete a safe power-off sequence involving backup of configuration information and status after a loss of VIN is detected. The capacitors are sized accordingly to account for anticipated system operation and the needs of the device being powered.

SUMMARY

An integrated circuit comprises a regulator circuit, a bootstrap control circuit, and a gate driver circuit. The gate driver circuit drives a transistor pair in buck or boost mode. The transistor pair includes a high side transistor and a low side transistor. The gate driver circuit drives gates of the high side transistor and the low side transistor to switch current through an inductor in buck or boost mode. The gate driver circuit is supplied from gate driver supply voltage that is generated by the bootstrap control circuit.

The integrated circuit has a VIN terminal, a STR terminal, a VOUT terminal, a HSB terminal, a SW terminal, and a PGND terminal. The VIN terminal is coupled to receive a voltage generated from an AC power source. The STR terminal is coupled to receive a voltage from a stored power source. In one example, the stored power source is a capacitor bank. The VOUT terminal is coupled to drive a load. The HSB terminal is capacitively coupled to a lead of the inductor. The SW terminal is coupled to a source of the high side transistor, to a drain of the low side transistor, and to the lead of the inductor. The PGND terminal is coupled to the source of the low side transistor.

When operating in buck mode or boost mode, the regulator circuit generates a VDD supply voltage from the stored power source. The regulator circuit supplies the generated VDD supply voltage onto the bootstrap control circuit. The bootstrap control circuit generates and supplies the gate driver supply voltage onto the gate driver supply node of the gate driver circuit. The gate driver circuit uses the received gate driver supply voltage to drive the high side and low side transistors.

When not bucking or boosting, minimal energy is drained from the stored power source. The bootstrap control circuit includes a charge pump that is coupled to the VOUT terminal. The HSB terminal is coupled to the gate driver supply node. When the gate driver circuit is not operating the high side and low side transistors in buck or boost mode, then the charge pump of the bootstrap control circuit is activated to maintain the HSB terminal within a voltage range that is greater than a voltage on the VIN terminal. The HSB terminal is maintained within the voltage range by drawing current from the VOUT terminal and without drawing current from stored power source.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a larger diagram formed by FIG. 2A and FIG. 2B.

DETAILED DESCRIPTION

Figure 1:
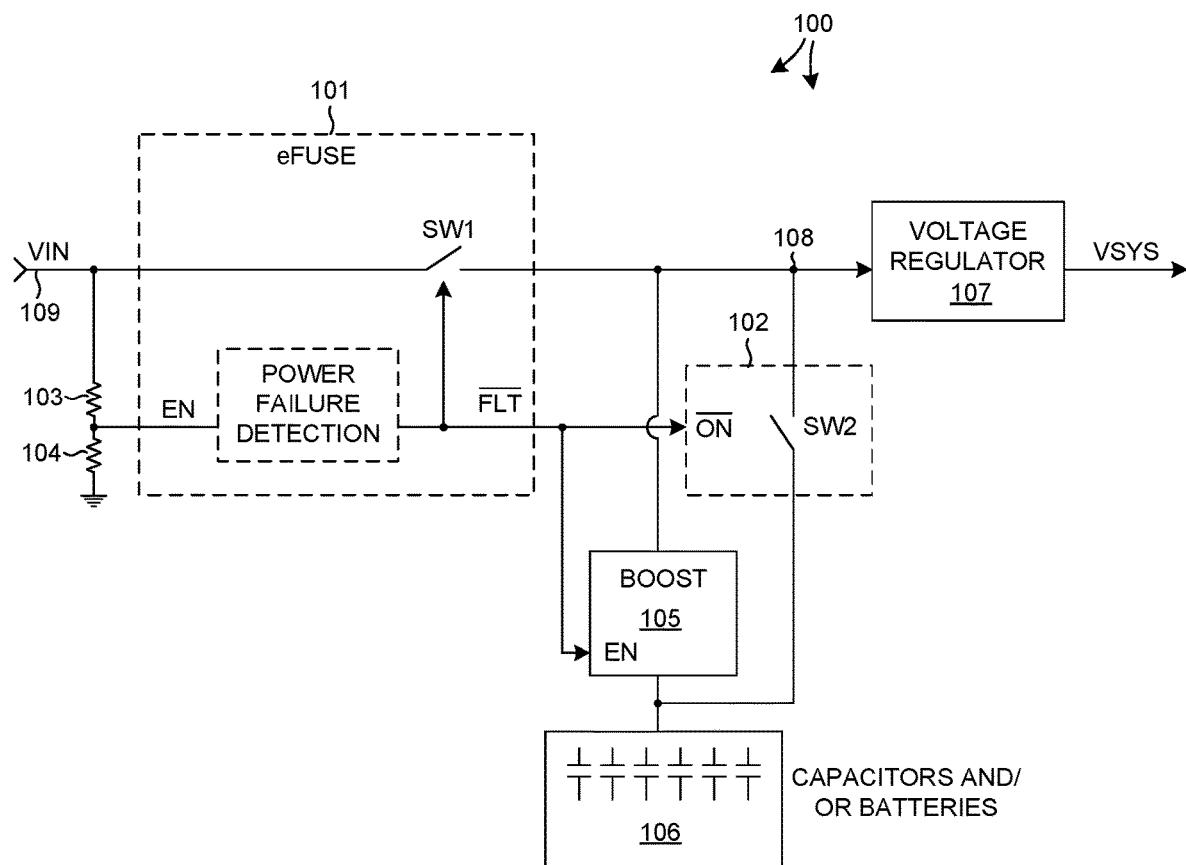
FIG. 1 (Prior Art) is a diagram of an example of a power loss protection system.
Figure 2A:
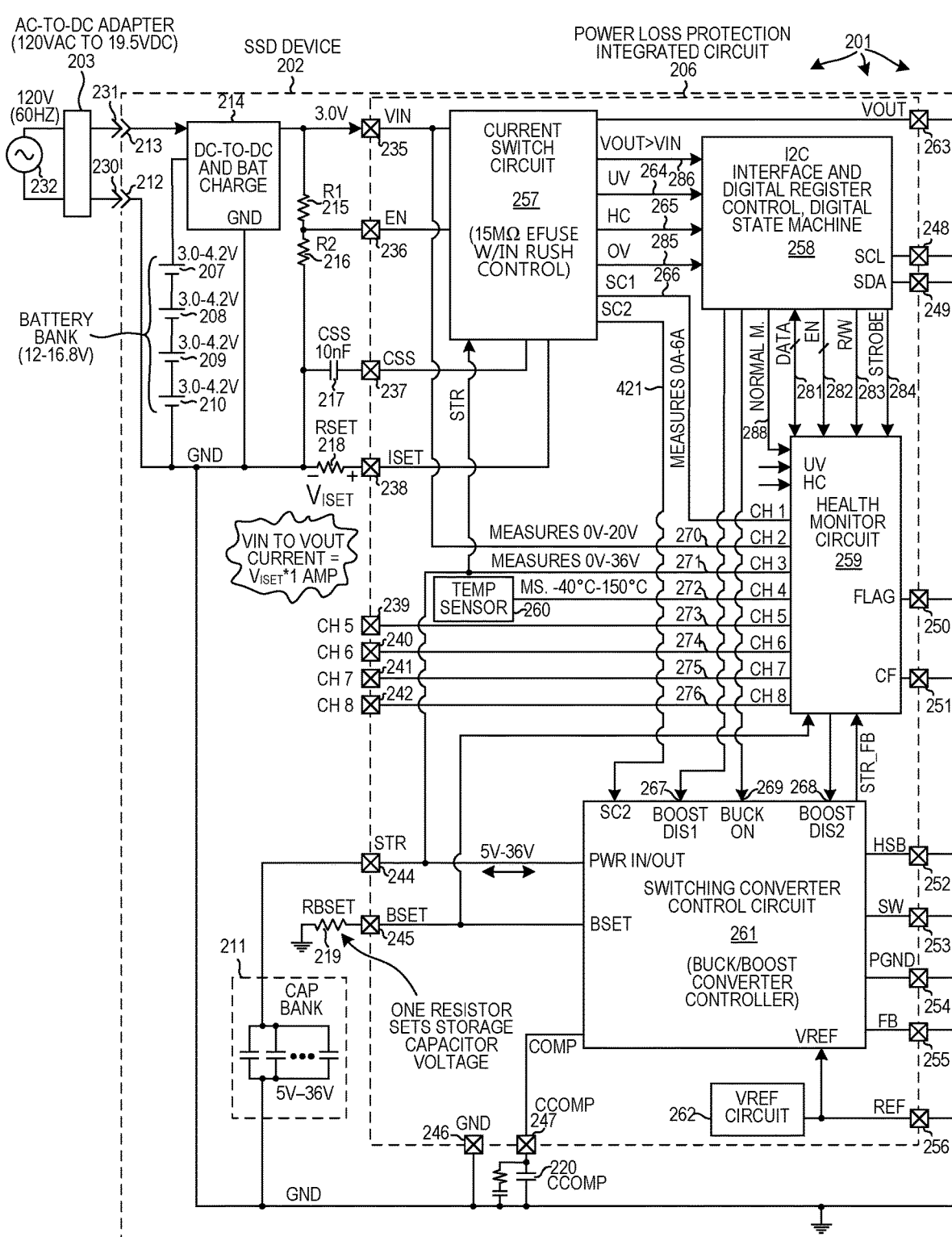
FIG. 2A is a first part of a larger diagram of a system involving a novel power loss protection integrated circuit.
Figure 2B:
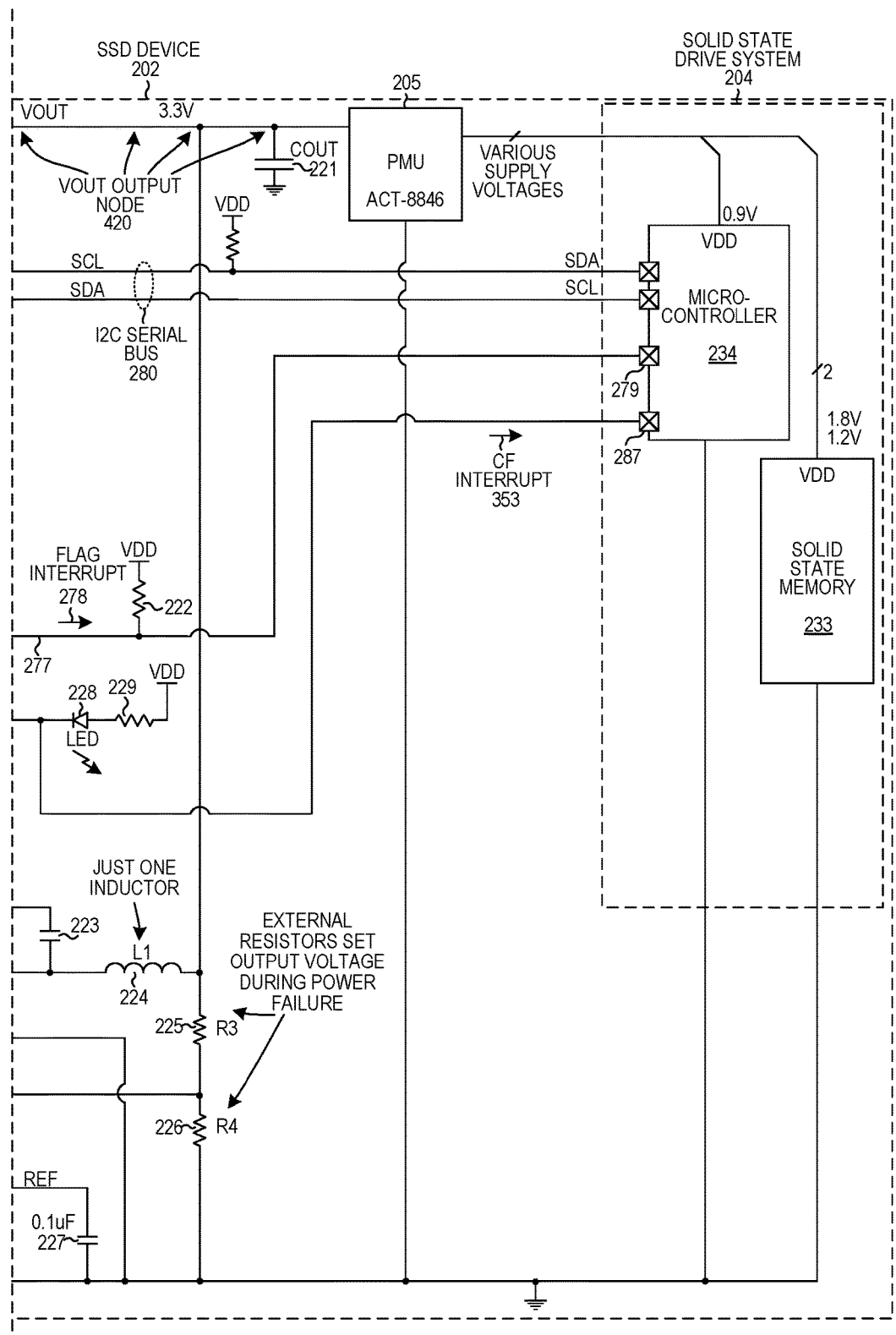
FIG. 2B is a second part of a larger diagram of a system involving a novel power loss protection integrated circuit.

FIG. 2A and FIG. 2B together form a larger diagram, FIG. 2.

FIG. 2 illustrates a system 201 that involves a device to be powered 202, and an AC-to-DC adapter 203. The device 202 in this particular example is a Solid State Drive (SSD) device. It includes a solid state drive system 204, a Power Management Unit (PMU) integrated circuit 205, a power loss protection integrated circuit 206, a bank of series-connected batteries 207-210, a bank of parallel-connected capacitors 211, a socket portion 212 and 213 of a connector, a DC-to-DC converter and battery charger 214, and other discrete components 215-229. The solid state drive system 204 includes, among other components not shown, a solid state memory portion 233 and a microcontroller integrated circuit 234. The AC-to-DC adapter 203 can be connected to the SSD device 202 by plugging its plug portion 230 and 231 into the socket portion 212 and 213 of the SSD device, and the AC-to-DC adapter 203 can be disconnected from the SSD device 202 by unplugging it from the socket portion. The AC-to-DC adapter 203 is coupled to receive power from a 120 volt RMS VAC 60 Hz supply voltage source 232 such as, for example, a standard residential wall socket. The SSD device 202 further includes a printed circuit board (not shown) disposed within an enclosure (not shown). The integrated circuits and other components of the SSD device 202 are mounted to the PCB and are contained in the enclosure.

Power loss protection integrated circuit 206 includes a VIN terminal 235, an EN terminal 236, a CSS terminal 237, an ISET terminal 238, several analog input terminals 239-242, a STR terminal 244, a voltage set input terminal BSET 245, a ground terminal GND 246, a CCOMP terminal 247, a VOUT terminal 263, an SCL terminal 248, a SDA terminal 249, a flag output terminal 250, a capacitor flat terminal CF 251, an HSB terminal 252, a SW terminal 253, a PGND terminal 254, an FB terminal 255, a REF terminal 256, a current switch circuit 257, an I2C interface and digital register control and digital state machine circuit 258, a health monitor circuit 259, an on-chip temperature sensor 260, a buck/boost switching converter control circuit 261, and a reference voltage circuit 262. The "terminals" mentioned above are integrated circuit terminals such as either bond pads of an integrated circuit chip or package terminals of an integrated circuit package that houses the actual integrated circuit chip.

The current switch circuit 257 is also called an eFuse circuit. The current switch circuit 257 can couple the VIN terminal 235 to the VOUT terminal 263 such that current can freely flow from the VIN terminal 235, through the current switch circuit 257, to the VOUT terminal 263, to VOUT output node 420, and to the load. When the current switch circuit 257 is ON in this way, it only introduces a 15 milliohm resistance in that current path. The current switch circuit 257 monitors the voltage on the VIN terminal. If the voltage on the VOUT terminal 263 is greater than the voltage on the VIN terminal 235, then the switch circuit 257 asserts the VOUT>VIN digital signal on conductor 286 to a digital logic high, otherwise the VOUT>VIN digital signal is a digital logic low. If the voltage on the VIN terminal is below an undervoltage value set by resistors 215 and 216, then the current switch circuit 257 is OFF such that the VIN terminal is not coupled to the VOUT terminal through the switch circuit 257. If the current switch circuit 257 detects the "UV" undervoltage condition, then it asserts the UV digital signal on conductor 264 to a digital logic high, otherwise the UV digital signal is a digital logic low. If the voltage on the VIN terminal is above a programmable overvoltage value, then the current switch circuit 257 is OFF such that the VIN terminal is not coupled to the VOUT terminal through the switch circuit 257. If the current switch 257 detects the "OV" overvoltage condition, then it asserts the OV digital signal on the OV conductor 285.

In addition to sensing voltages, the current switch circuit 257 also senses the magnitude of current flowing through the current switch between the VIN terminal and the VOUT terminal. If the current is below a predetermined high current value ($A_{HC}$), and if the current switch 257 is to be ON as determined by the voltage on the VIN terminal, then the current switch is fully ON (to have a resistance of 15 milliohms or less). If, however, the current is detected to reach the high current value ($A_{HC}$), then the current switch circuit begins to regulate the through-current so that the through-current remains at the high current value amount $A_{HC}$ but does not exceed $A_{HC}$. The current switch 257 does this by controlling the gate voltages on a pair of series field effect transistors through which the through-current flows. Increasing the drain-to-source resistance $R_{DS}$ of these field effect transistors allows the flow of current to be maintained at the $A_{HC}$ amount. If, however, the $R_{DS}$ across the transistors becomes too high, or if the voltage on the VOUT terminal decreases too much, then the field effect transistors are not linearly regulated by controlling their $R_{DS}$ resistances, but rather the field effect transistors are turned on and off repeatedly with a duty cycle. The duty cycle is regulated in an attempt to limit the power dropped in the current switch circuit 257. In this way, the current switch circuit 257 serves a function of limiting the magnitude of a possible large inrush current (inrush power) that might otherwise flow into the system when the SSD device is initially plugged into the AC-to-DC adapter 203 when the storage capacitors 211 are fully discharged and when the COUT capacitor 221 is fully discharged. In the present example, the inrush current limit set by the resistance of resistor RSET 218 is a current (for example, two amperes) that is larger than a typical digital logic or analog signaling input terminal or output terminal could handle.

The CSS capacitor 217 slows down the start up slew rate of the current switch circuit 257, thereby providing a "soft start" operation. The board designer can select the capacitance value of the CSS capacitor to tailor the startup slew rate as desired. If left open, the startup slew rate defaults to one millivolt per microsecond. The high current value ($A_{HS}$) is set by setting the resistance value of resistor RSET 218. The high current value $A_{HC}$ is roughly equal to one volt divided by the RSET value in ohms. If the current switch circuit 257 detects the "HC" high current condition, then it asserts the HC digital signal on conductor 265 to digital logic high, otherwise the HC digital signal is a digital logic low. The current switch circuit 257 includes a current sensor/mirror circuit 290 that provides a small auxiliary current flow whose magnitude is proportional to the magnitude of the main current flow through the current switch circuit 257 from the VIN terminal to the VOUT terminal. This small mirrored auxiliary current is converted into a voltage signal by making the current flow across the RSET resistor 218. The resulting voltage signal, whose magnitude is proportional to the current flow through the switch circuit 257, is output from the current switch circuit 257 via the switch current (SC1) conductor 266. The voltage signal SC1 on the switch current SC1 conductor 266 is indicative of the magnitude of the current flowing through the current switch 257. For additional information on the structure and operation of current sense/mirror circuit 291, see U.S. patent application Ser. No. 15/476,977, now U.S. Pat. No. 10,090, 675, entitled "Fast Settlement Of Supplement Converter For Power Loss Protection System," by Lam et al. filed on Apr. 1, 2017. The entire subject matter of U.S. patent application Ser. No. 15/476,977, now U.S. Pat. No. 10,090,675, is hereby incorporated by reference.

In addition to voltage signal SC1, the current switch circuit 257 also outputs another signal (SC2). Signal SC2 is a current that is proportional to the current flowing through the current switch 257 from the VIN terminal to the VOUT terminal. This current signal SC2 is communicated via conductor 421 to the switching converter control circuit 261. In the switching converter control circuit 261, the current SC2 is converted into a voltage signal by running the current through a resistor 422.

The buck/boost switching converter control circuit 261, together with external components 220, 221 and 223-227 is operable as a buck switching converter or as a boost switching converter. When it is operating in a boost mode, the converter receives a relatively low voltage from the VOUT terminal, and outputs a boosted up relatively high voltage onto the STR terminal 244. In one example, the voltage on the VOUT terminal is 3.3 volts DC, and the voltage that the converter drives onto the STR terminal 244 is 36 volts DC. This relatively high voltage serves to charge the capacitor bank 211 capacitors up to 36 volts. The magnitude of this charging voltage is set by the value of the RBSET resistor 219. When the converter is operating in a buck mode, the converter receives a relatively high voltage from the STR terminal 244, and outputs a bucked down relatively low voltage onto the VOUT terminal 263. In one example, the voltage on the STR terminal 244 is 36 volts (as set by the RBSET resistor), and the voltage that the converter drives onto the VOUT terminal is 3.3 volts DC. The buck/boost switching converter control circuit 261 has an active high boost disable digital signal input lead BOOST_DIS1 267 and another active high boost disable digital input lead BOOST_DIS2 268. If a digital logic high signal is present on either of these inputs, then the converter is prevented (disabled) from operating in the boost mode. The buck/boost switching converter control circuit 261 also has an active high digital signal input lead BUCK ON 269. If a digital logic high signal is present on this input 269, then the converter is made to start operating in the buck mode.

The health monitor circuit 259 includes an eight-channel sigma-delta Analog-to-Digital Converter (ADC), a set of compare-and-mask circuits, and a digital state machine. The health monitor circuit 259 autonomously monitors the voltages on eight input conductors 266 and 270-276 (8 channels). If any one of these voltages is detected to be below a corresponding lower voltage limit or is detected to be above a corresponding upper voltage limit, then this undervoltage or overvoltage condition is latched into a latch of the detecting compare-and-mask circuit, and the voltage on flag terminal 250 is pulled down to ground potential. The voltage on the open-drain flag terminal 250 is otherwise not pulled down, but rather is pulled up to the VDD supply voltage by external pullup resistor 222. The low voltage (ground potential) on flag terminal 250 and conductor 277 constitutes an interrupt signal 278. This active low interrupt signal 278 is supplied via conductor 277 onto the active low interrupt input terminal 279 of microcontroller 234. The low interrupt signal therefore interrupts the microcontroller 234. The microcontroller 234 can respond to the interrupt, as further explained below, by accessing the power loss protection integrated circuit 206 via the two-wire I2C bus 280. The two conductors SDL and SDA are the two conductors of the I2C bus. The values of the lower voltage limit and the upper voltage limit for each of the eight channels is user programmable (changeable via the microcontroller 234 under software control) via the I2C interface of terminals 248 and 249. In the present example, the measurable voltage range on conductor 266 corresponds to a measured through-current flowing through the current switch 257 in the range of from zero amperes to six amperes. In the present example, the measurable voltage range on conductor 270 corresponds to a measured voltage on the VIN terminal in the range of from zero volts to twenty volts. In the present example, the measurable voltage range on conductor 271 corresponds to a measured storage capacitor voltage on the STR terminal in the range of from zero volts to thirty-six volts. In the present example, the measurable voltage range on conductor 272 corresponds to a measured on-chip temperature in the range of from minus forty degrees Celsius to plus one hundred and fifty degrees Celsius.

The health monitor circuit 259 also includes a capacitor health check circuit 299. The capacitor health check circuit 299 includes a digital state machine. If the power loss protection integrated circuit 206 is not operating in the normal mode as indicated by the active high NORMAL MODE digital signal on conductor 288, then the capacitor health check circuit is disabled. If, however, the power loss protection integrated circuit 206 has been operating in the normal mode for a least four minutes, at the conclusion of the four minute period the state machine disables the boost converter and enables a ten milliampere current source 293. The ten milliampere current source 293 sinks current from the STR terminal 244. At the end of a time period determined by the programmable value TSET[3:0], the state machine disables the ten milliampere current source 293 and enables a fifty milliampere current source 394 that sinks current from the STR terminal 244. The fifty milliampere current source remains enabled for a period of time determined by the value TSET[3:0]. In one example, this time period is one tenth the period of time the ten milliampere current source was enabled. If at any time during the period of time when either of the two sinking current sources is enabled the voltage on the STR terminal 244 falls below a programmable voltage, then a latch 292 is set. The programmable voltage is determined by the user programmable value THR[3:0]. The setting of the latch causes the voltage on the capacitor fault terminal CF 251 to be pulled down to ground potential. This is an indication of a capacitor fault condition. This active low fault signal 353 may, for example, be supplied onto a second interrupt input terminal 287. In addition, the LED 228 is on during the time when the capacitor fault signal is asserted low.

The I2C interface and digital register control and digital state machine circuit 258 is a digital block that includes an I2C serial bus interface circuit and a digital state machine circuit. There are various digital registers disposed in various places across the integrated circuit. The digital outputs of various ones of the bits of these registers are coupled to various circuits in the integrated circuit so that the stored digital values will control and affect operation of the circuitry. Other selected bits of the registers are used to capture the digital states of corresponding nodes in the circuitry. The I2C interface is usable to read and to write to any selected one of these registers via the DATA conductors 281, the enable conductors 282, the R/W conductor 283 and the strobe conductor 284. The DATA conductors 281, the R/W conductor 283, and the strobe conductor 284 extend to all these registers. For each register, there is one dedicated enable conductor that extends from the I2C interface logic to an enable input lead of that register.

To write an 8-bit value into a particular register, the I2C interface places the data to be written onto the DATA conductors 281. Because the access is a write, the voltage on the R/W conductor 282 is driven to a digital logic low level. The enable conductors to all the registers are driven to be disabled (digital logic low), except for the one desired register that is to be written. The enable conductor to that register is driven with a digital logic high signal. After these signals are set up, the strobe signal on conductor 284 is pulsed high to clock the data into the enabled register. The 8-bit value stored in a particular register can be read by the I2C interface in similar fashion except that the I2C interface does not drive data out on the DATA conductors, but rather the I2C is setup to read in data from the DATA conductors. In addition, the digital logic value driven onto the R/W conductor is a digital logic high value. When the data bus conductors are set up this way, a pulsing of the strobe signal causes the enabled register to output its 8-bit value onto the 8-bit DATA bus, so that the 8-bit value will then be latched into the I2C interface logic. In this way, the I2C interface can read from, and can write to, any selected one of the registers on the integrated circuit.

Figure 3:
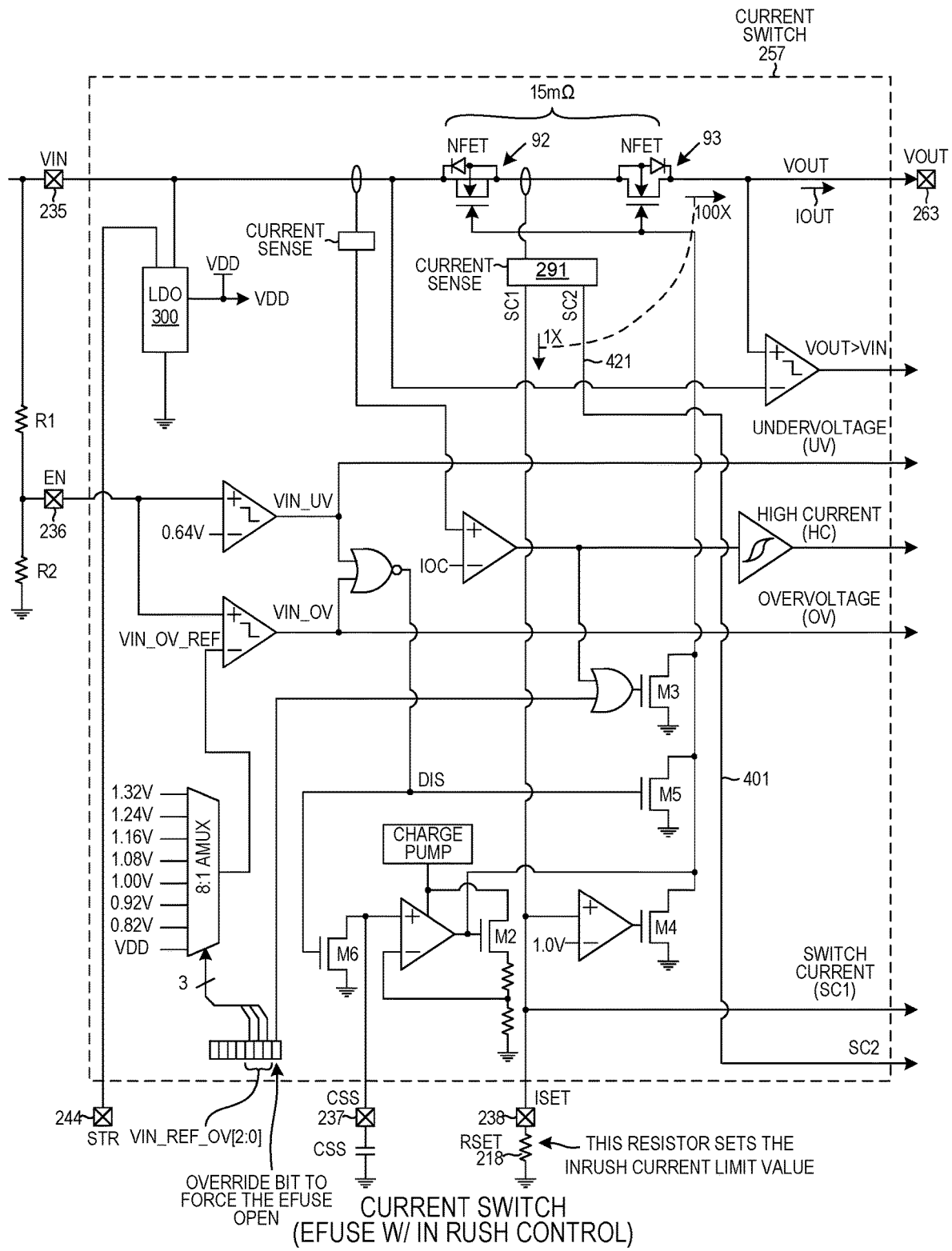
FIG. 3 is a more detailed diagram of the current switch circuit 257 of FIG. 2.

FIG. 3 is a more detailed diagram of the current switch circuit 257 of FIG. 2.

Figure 4:
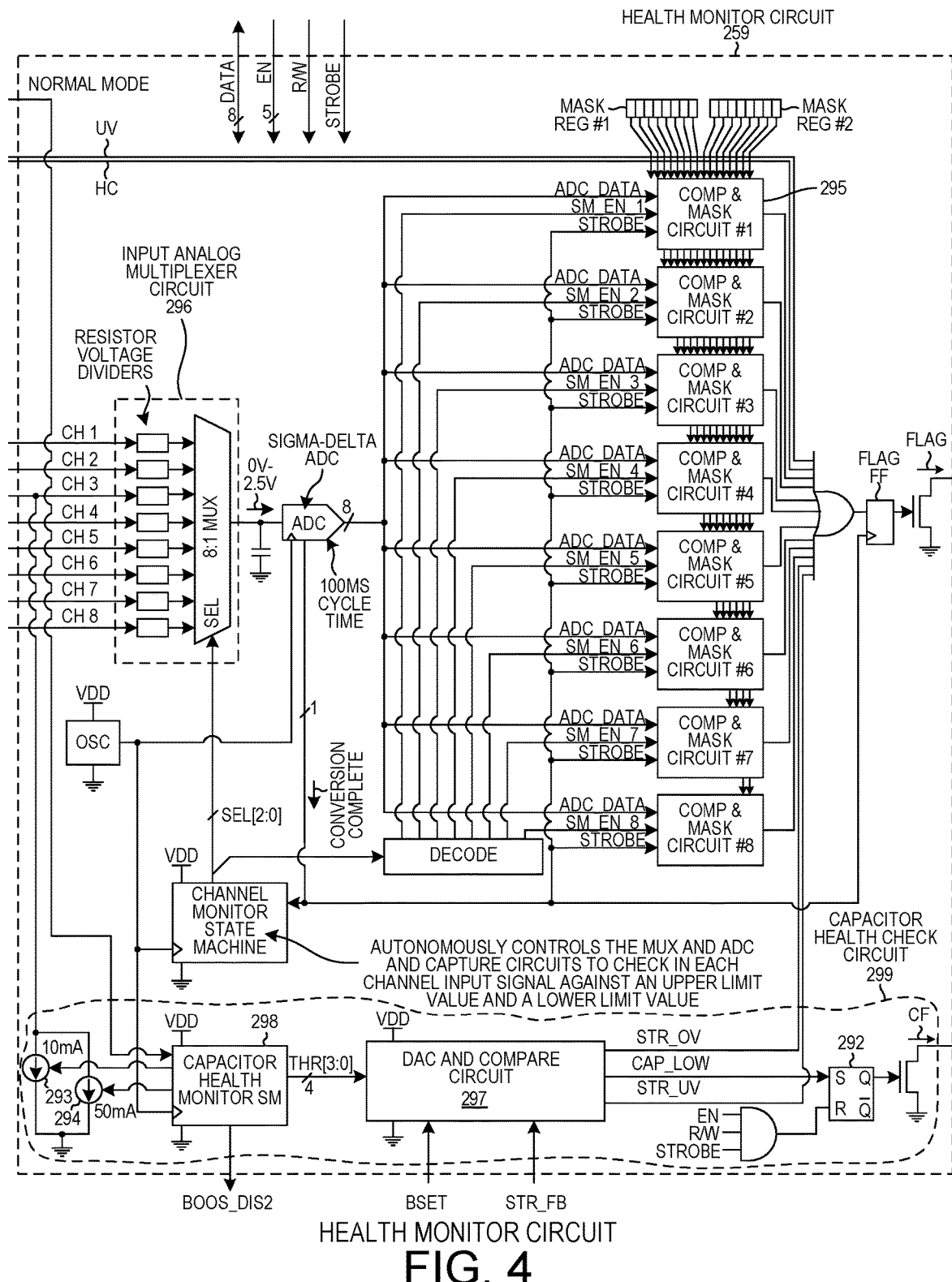
FIG. 4 is a more detailed diagram of the health monitor circuit 259 of FIG. 2.

FIG. 4 is a more detailed diagram of the health monitor circuit 259 of FIG. 2.

Figure 5:
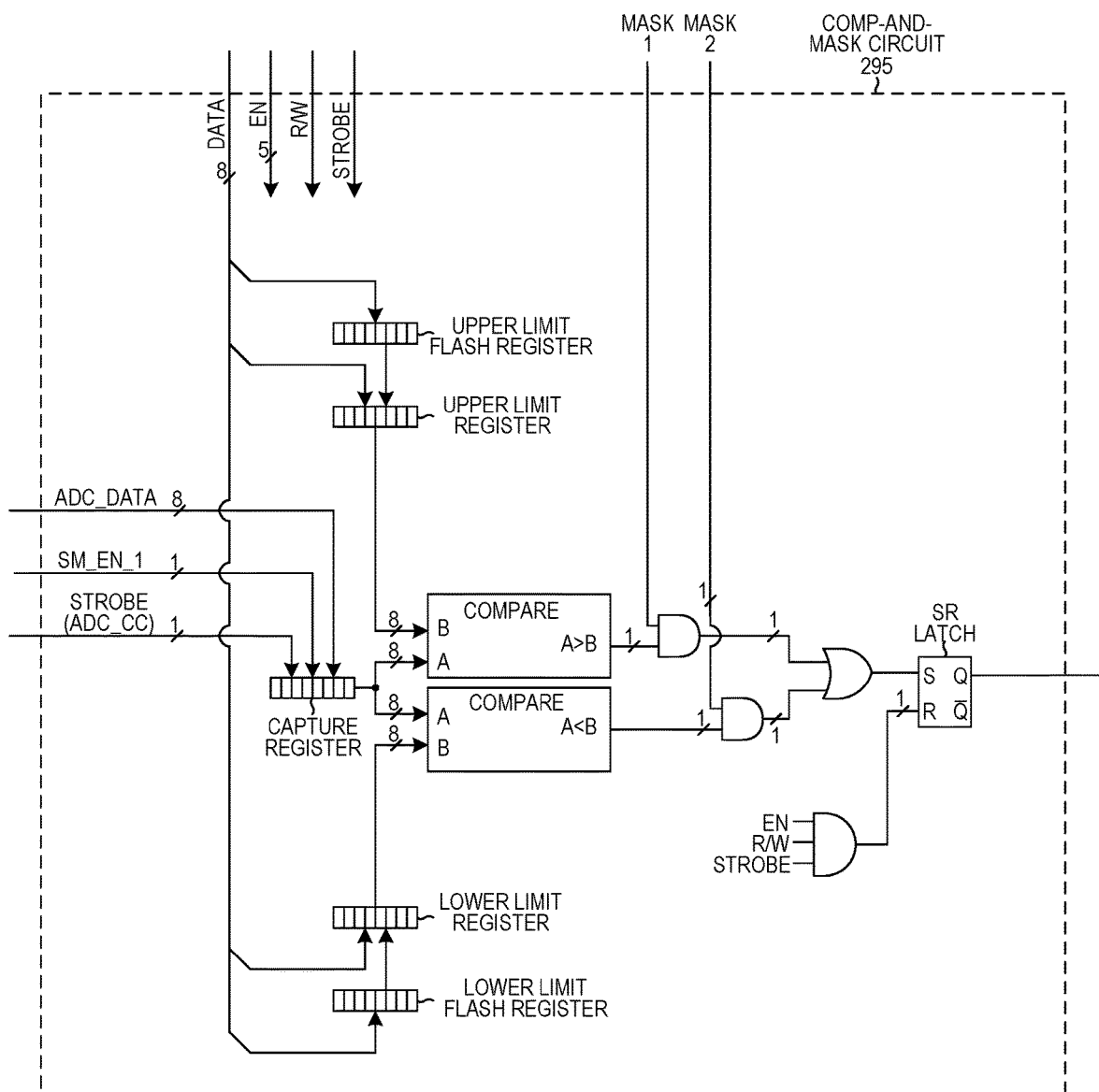
FIG. 5 is a more detailed diagram of one of the compare-and-mask circuits of FIG. 4.

FIG. 5 is a more detailed diagram of one of the compare-and-mask circuits 295 of FIG. 4.

Figure 6:
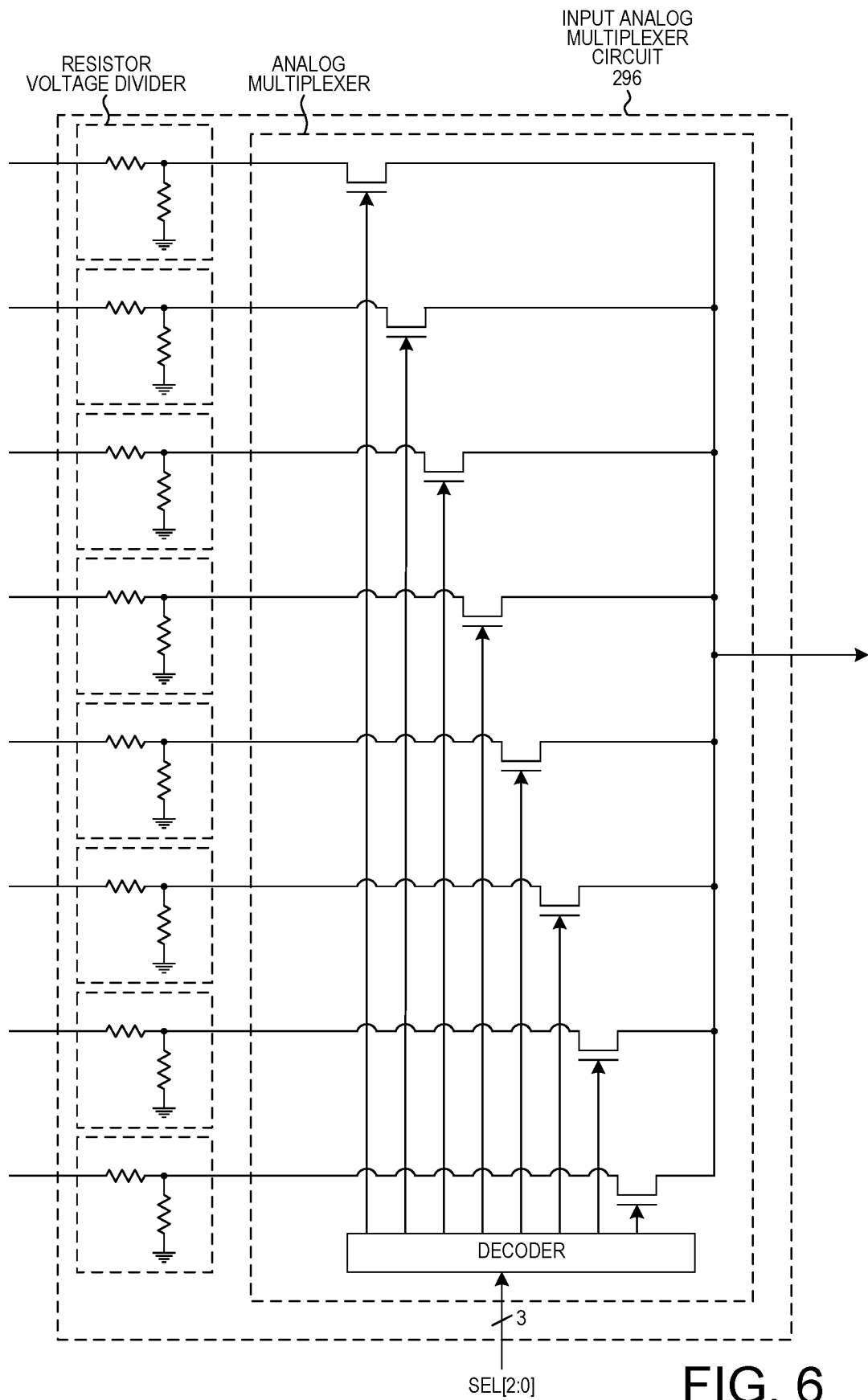
FIG. 6 is a more detailed diagram of the input analog multiplexer circuit of FIG. 4.

FIG. 6 is a more detailed diagram of the input analog multiplexer circuit 296 of FIG. 4.

Figure 7:
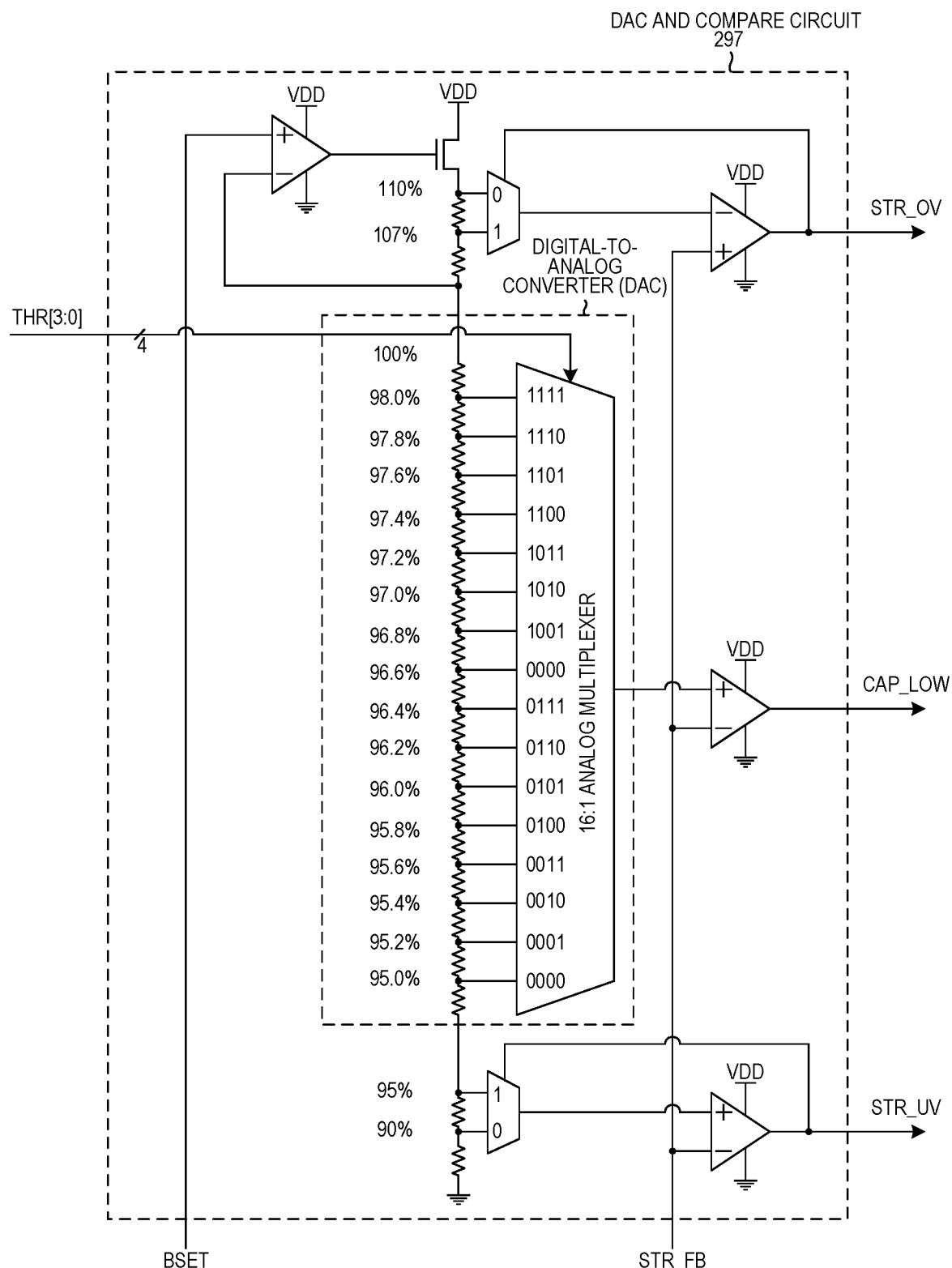
FIG. 7 is a more detailed diagram of the DAC and compare circuit of FIG. 4.

FIG. 7 is a more detailed diagram of the DAC and compare circuit 297 of FIG. 4.

Figure 8:
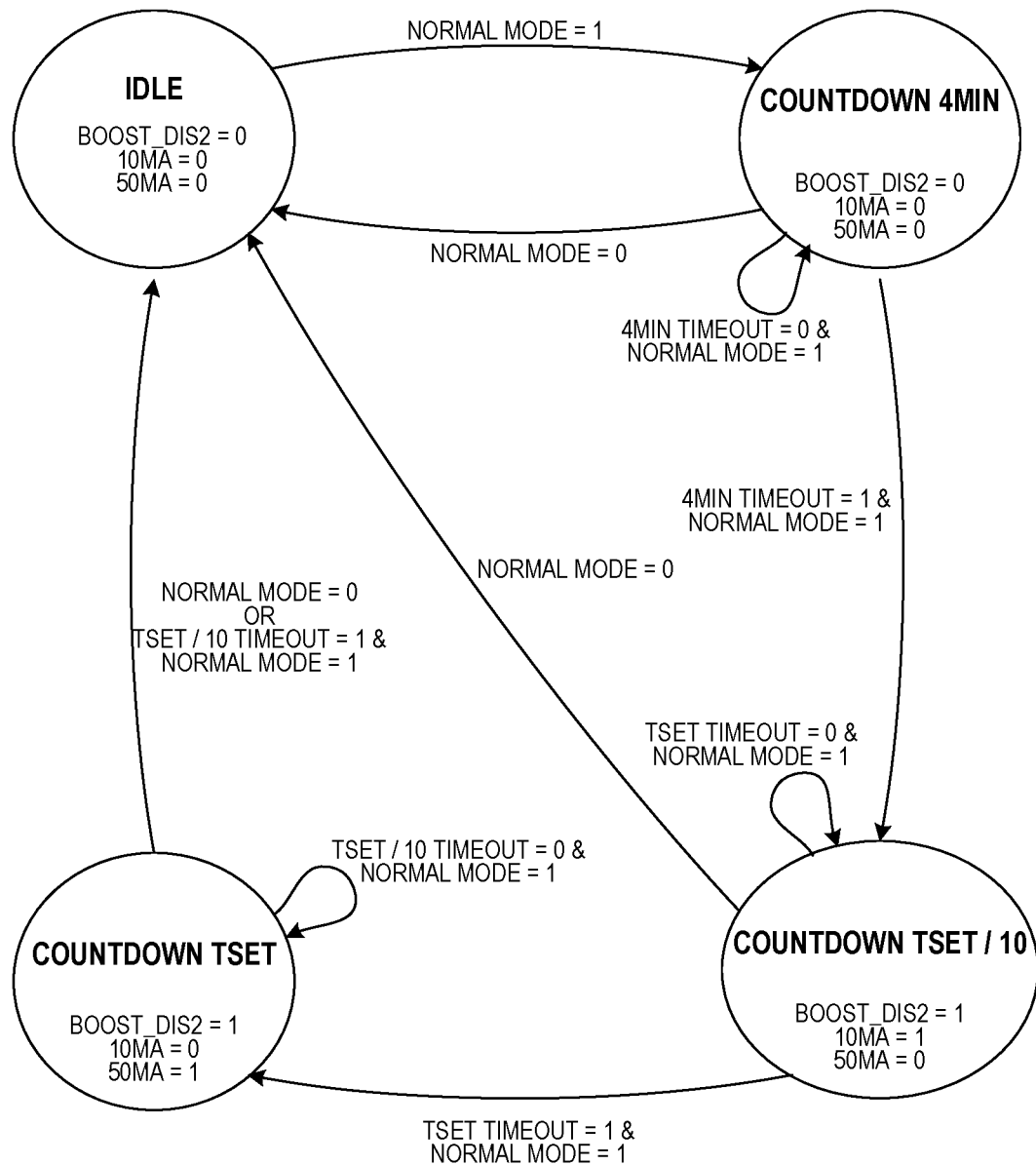
FIG. 8 is a state diagram that sets forth the operation of the capacitor health monitor state machine of the capacitor health check circuit.

FIG. 8 is a state diagram that sets forth the operation of the capacitor health monitor state machine 298 of the capacitor health check circuit 299 of the health monitor circuit 259 of FIG. 4.

Figures 9, 10:
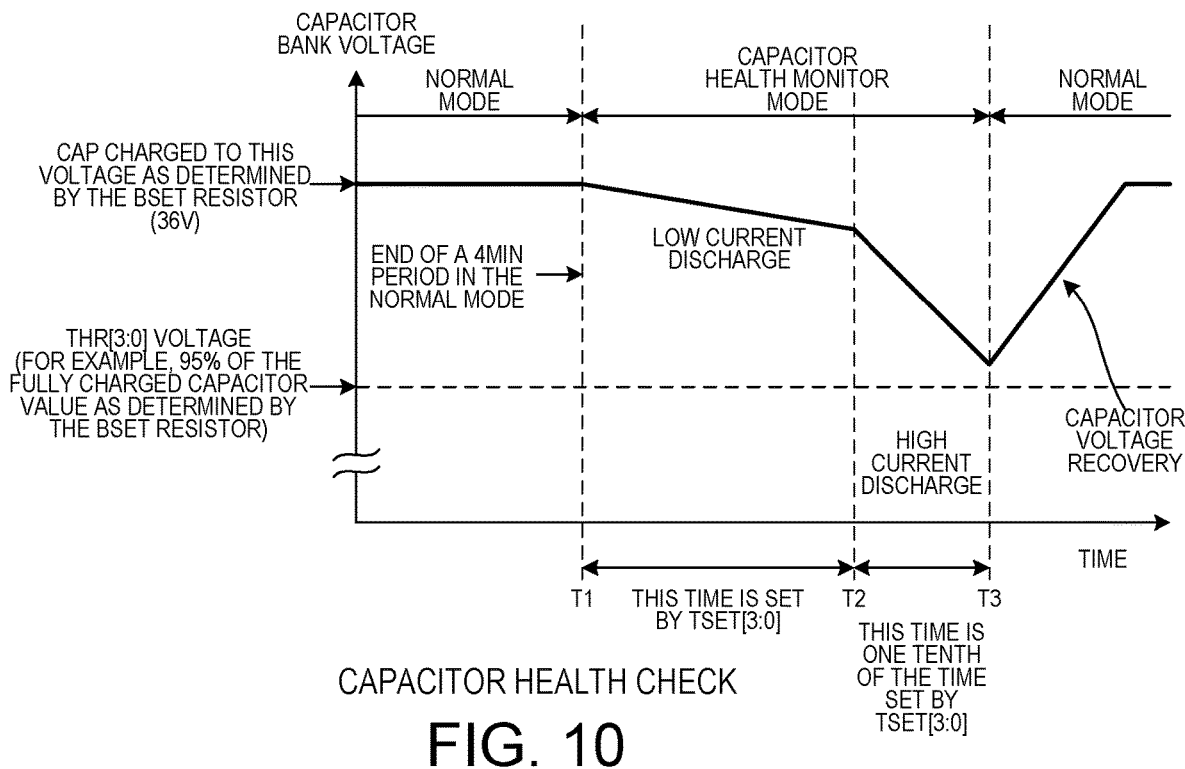
FIG. 9 is a table that indicates, for each 4-bit TSET[3:0] value, the corresponding time period throughout which the ten milliampere current sink is enabled.
FIG. 10 is a diagram that illustrates one capacitor health check operation as carried out by the capacitor health check circuit.

FIG. 9 is a table that indicates, for each 4-bit TSET[3:0] value, the corresponding time period throughout which the ten milliampere current sink is enabled.

FIG. 10 is a diagram that illustrates one capacitor health check operation as carried out by the capacitor health check circuit 299.

Figure 11:
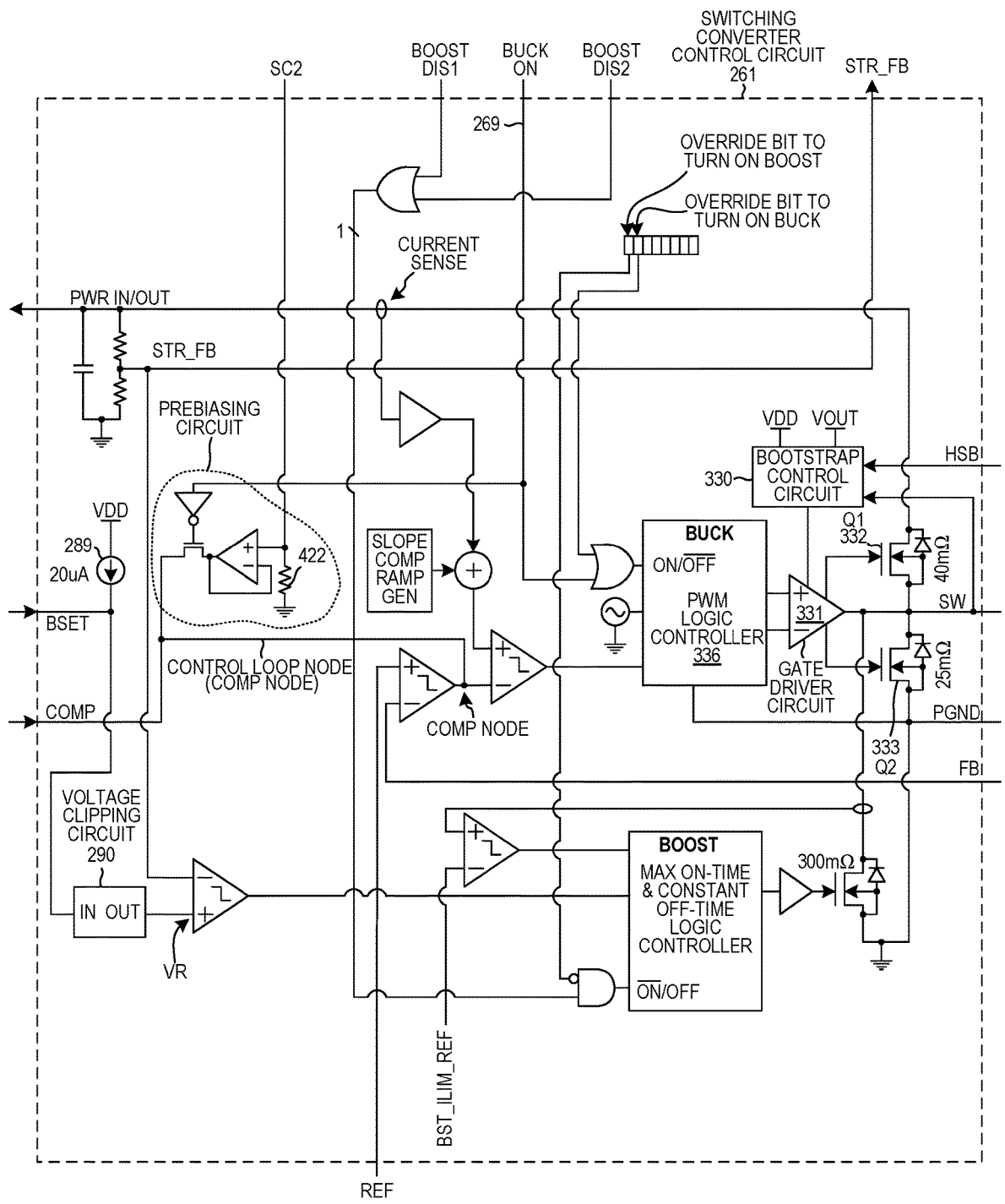
FIG. 11 is a diagram of the switching converter control circuit 261 of FIG. 2.

FIG. 11 is a diagram of the switching converter control circuit 261 of FIG. 2.

Figure 12:
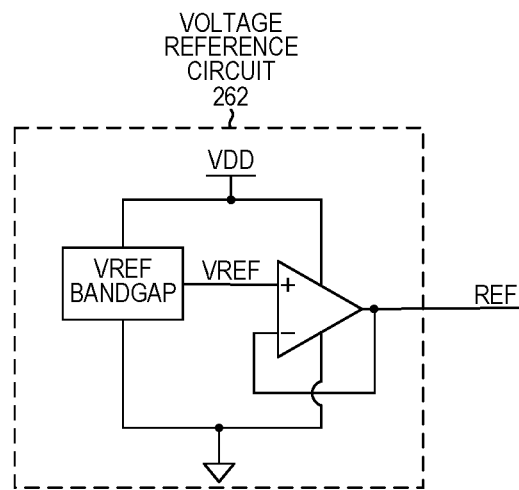
FIG. 12 is a more detailed diagram of the voltage reference circuit 262 of FIG. 2.

FIG. 12 is a more detailed diagram of the voltage reference circuit 262 of FIG. 2.

Figure 13:
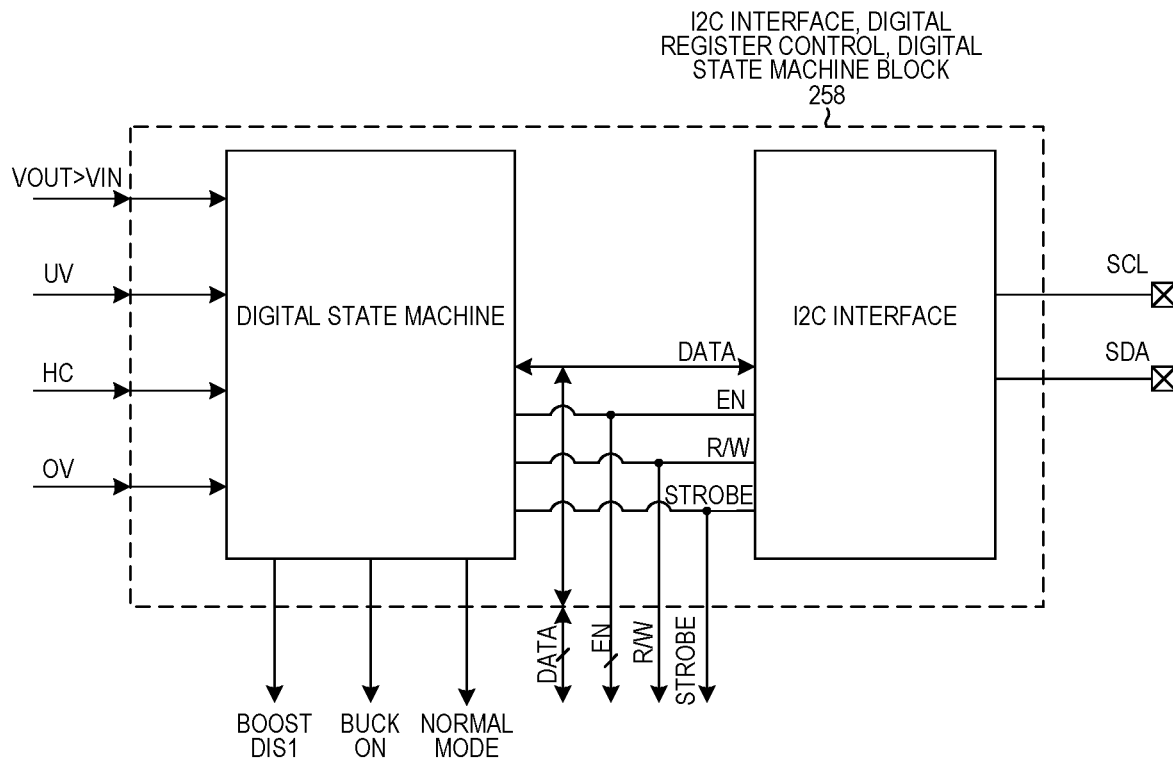
FIG. 13 is a block diagram of the I2C interface and digital register control and digital state machine circuit 258 of FIG. 2.

FIG. 13 is a block diagram of the I2C interface and digital register control and digital state machine circuit 258 of FIG. 2.

The magnitude of the relatively high voltage to which the converter boosts in the boost mode is user programmable, and is set by providing only one external resistor RBSET 219 of the appropriate resistance. Provided that the voltage on the voltage set input terminal BSET 245 is not below a first predetermined voltage V1 and is not above a second predetermined voltage V2, the magnitude of the resistance of this one RBSET resistor 219 corresponds directly to the magnitude of the relatively high voltage to which the STR terminal 244 is driven in the boost mode. The relatively high voltage to which the STR terminal 244 is driven in the boost mode is a gained-up version of the voltage on the BSET terminal 245. The voltage on the BSET terminal 245 is equal to the resistance of the RBSET resistor 219 multiplied by the twenty microampere current supplied by internal current source 289 of FIG. 11. Block 290 in FIG. 11 is a voltage clipping circuit. For additional information on the structure and operation of voltage clipping circuit 290, see U.S. patent application Ser. No. 15/466,681 entitled "Programmable Voltage Setting With Open And Short Circuit Protection," by Dinh et al. filed on Mar. 22, 2017. The entire subject matter of U.S. patent application Ser. No. 15/466,681 is hereby incorporated by reference.

Figure 14:
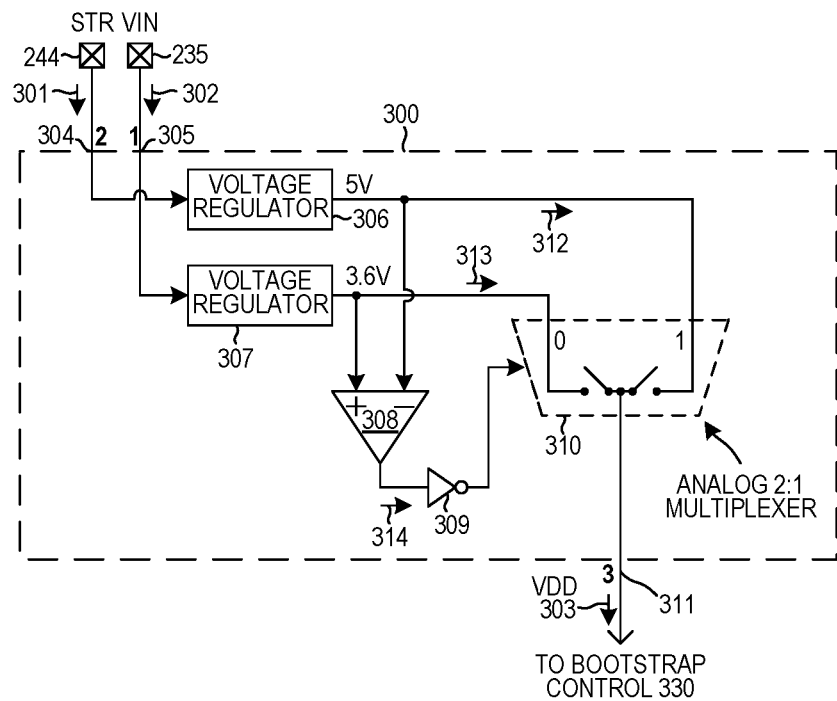
FIG. 14 is a circuit diagram of linear regulator (LDO) circuit 300 of FIG. 3

FIG. 14 is a circuit diagram of linear regulator circuit 300 of FIG. 3. In this example, linear regulator circuit 300 is a low-dropout (LDO) regulator circuit. LDO circuit 300 is coupled to receive a voltage 301 from VIN terminal 235 and a voltage 302 on the STR terminal 244. LDO circuit generates and outputs VDD supply voltage 303. LDO circuit 300 comprises a first input lead 304, a second input lead 305, a first voltage regulator 306, a second voltage regulator 307, a comparator 308, an inverter 309, a multiplexer circuit 310, and an output terminal 311. The supply to the comparator 308 and inverter 309 circuitry is omitted from the diagrams, however, these components are supplied from an internal supply. LDO circuit 300 generates VDD supply voltage 303 from either voltage 301 on STR terminal 244 or voltage 302 on VIN terminal 235. VDD supply voltage 303 is generated from either STR terminal 244 or VIN terminal 235 depending on which of the voltages 312 and 313 output by regulators 306 and 307 has the higher voltage level. In one example, VT1 is 3.5 volts and VT2 is 2.8 volts.

During operation, voltage regulator 306 receives voltage signal 301 from STR terminal 244 and outputs a first regulated voltage 312. The first regulated voltage 312 is supplied to multiplexer 310. Voltage regulator 307 receives voltage signal 302 from VIN terminal 235 and outputs a second regulated voltage 313. The second regulated voltage 312 is supplied to multiplexer 310. In one example, voltage regulator 306 regulates voltage 301 to 5.0 volts, and voltage regulator 307 regulates voltage 302 to 3.6 volts.

The inverting input of comparator 308 receives the first regulated voltage 312 and the non-inverting input of comparator 308 receives the second regulated voltage 313. The output 314 of comparator 309 is supplied to inverter 309. Inverter 309 generates an inverted version of output 314 and supplies select signal 315 to multiplexer 310. The select signal 315 selects between the first regulated voltage 312 and the second regulated voltage 313. If the first regulated voltage 312 is greater than the second regulated voltage 313, then multiplexer 310 outputs the first regulated voltage 312 onto output terminal 311. If, on the other hand, the second regulated voltage 313 is greater than the first regulated voltage 312, then multiplexer 310 outputs the second regulated voltage 313 onto output terminal 311.

Figure 15:
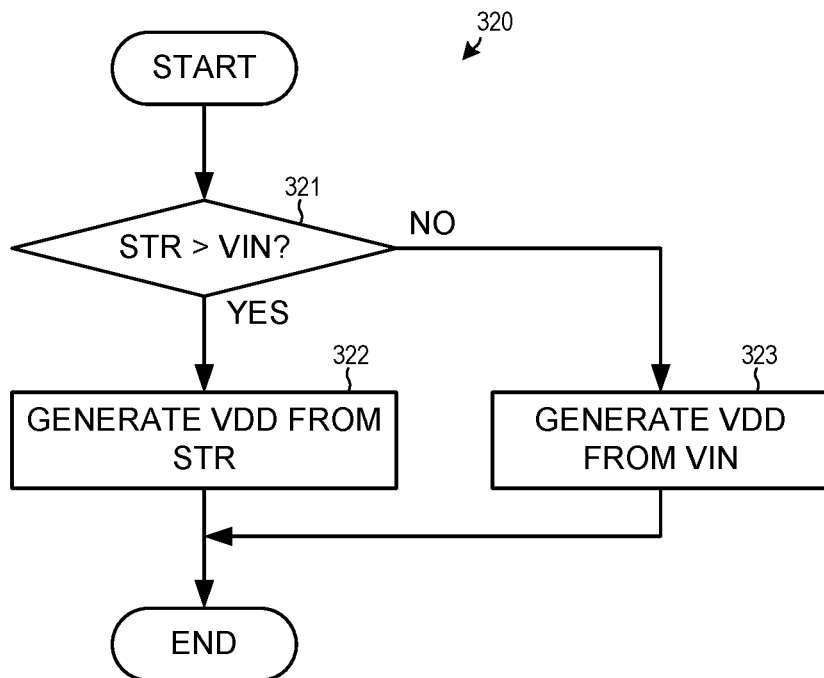
FIG. 15 is a flowchart of a method 320 that shows an operation of the LDO circuit 300 of FIG. 14.

FIG. 15 is a flowchart of a method 320 that shows an operation of the LDO circuit 300 of FIG. 14. First (step 321), the voltage on the STR terminal 244 is compared to the voltage on the VIN terminal 235. For example, comparator 308 compares the regulated voltages 312 and 313 on the STR terminal 244 and the VIN terminal 235, respectively. If the voltage on the STR terminal 244 is greater than the voltage on the VIN terminal 235, then the VDD supply voltage 303 is generated from STR terminal 244 (step 322). If, however, the voltage on the STR terminal 244 is not greater than the voltage on the VIN terminal 235, then the VDD supply voltage 303 is generated from VIN terminal 235 (step 323).

Figure 16:
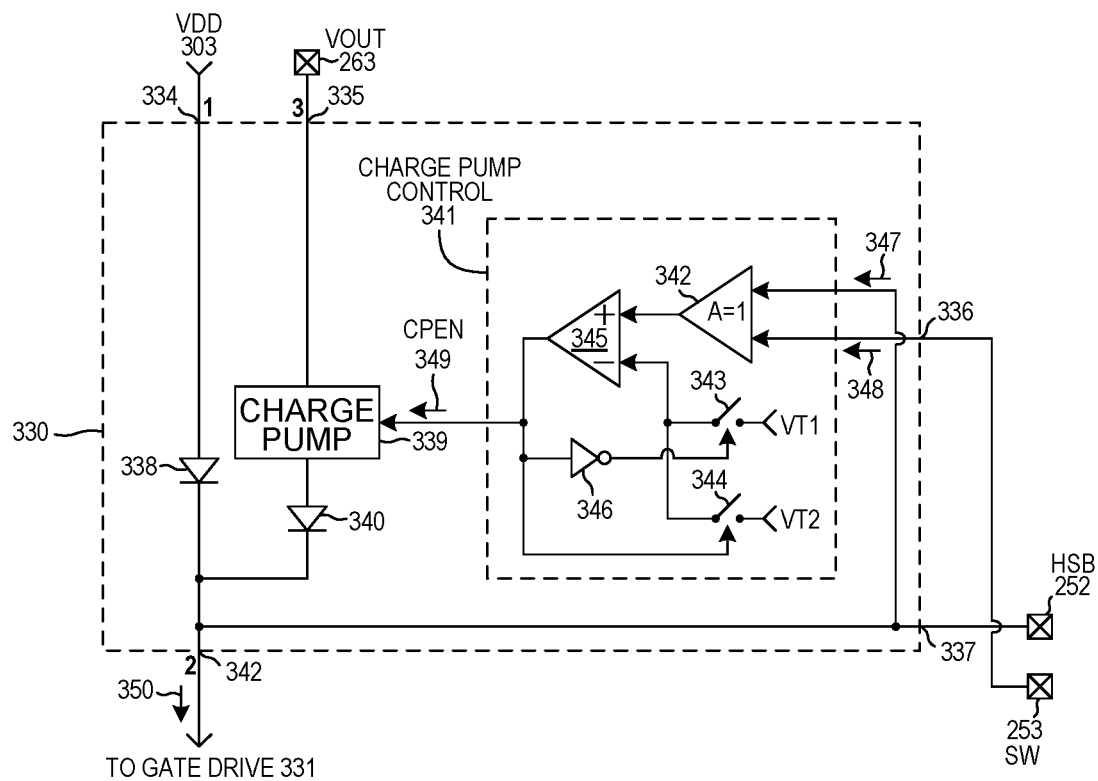
FIG. 16 is a detailed circuit diagram of bootstrap control circuit 330.

FIG. 16 is a detailed circuit diagram of bootstrap control circuit 330. The bootstrap control circuit 330 is part of the switching converter control circuit 261 shown in FIG. 11. The bootstrap control circuit 330 supplies gate driver circuit 331 which in turn drives high side transistor Q1 332 and low side transistor Q2 333. Bootstrap control circuit 330 comprises a first input node 334, a second input node 335, a third input node 336, a fourth input node 337, a first diode 338, a charge pump 339, a second diode 340, charge pump control circuit 341, and output node 342. Bootstrap control circuit 330 generates and supplies gate driver supply voltage 350 onto gate driver circuit 331.

The charge pump control circuit 341 comprises an amplifier 342, switches 343 and 344, comparator 345, and inverter 346. The charge pump control circuit 341 receives voltage 347 from HSB terminal 252 and voltage 348 from SW terminal 253. The charge pump control circuit 341 generates and outputs charge pump control signal CPEN 349 to charge pump 339. The charge pump control circuit 341 controls the charge pump 339 to maintain voltage 347 on HSB terminal 252 within VT1 and VT2 of SW terminal 253. In one example, VT1 is 3.5 volts and VT2 is 2.8 volts.

Figure 17:
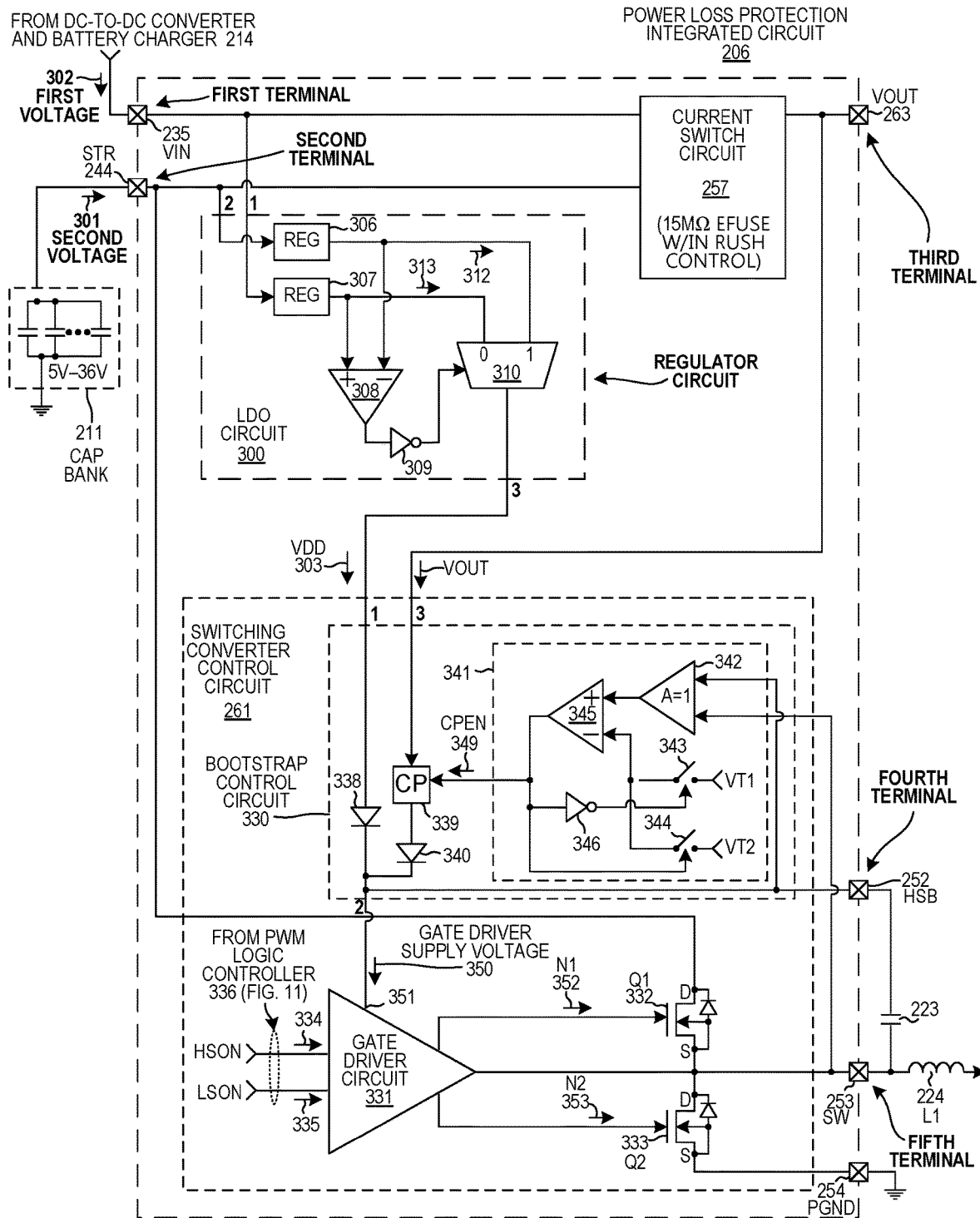
FIG. 17 is a detailed circuit diagram showing how the LDO circuit 300 and bootstrap control circuit 330 operate to generate and supply gate driver supply voltage 350 onto node 351 of gate driver circuit 331.

FIG. 17 is a detailed circuit diagram showing how the LDO circuit 300 and bootstrap control circuit 330 operate to generate and supply gate driver supply voltage 350 onto gate driver supply node 351 of gate driver circuit 331. Gate driver circuit 331, in turn, generates and supplies control signal N1 352 onto a gate of high side transistor Q1 332 and generates and supplies control signal N2 353 onto a gate of low side transistor Q2 333. Gate driver circuit 331 receives control signals HSON 334 and LSON 335 from PWM logic controller 336 shown in FIG. 11.

Figure 18:
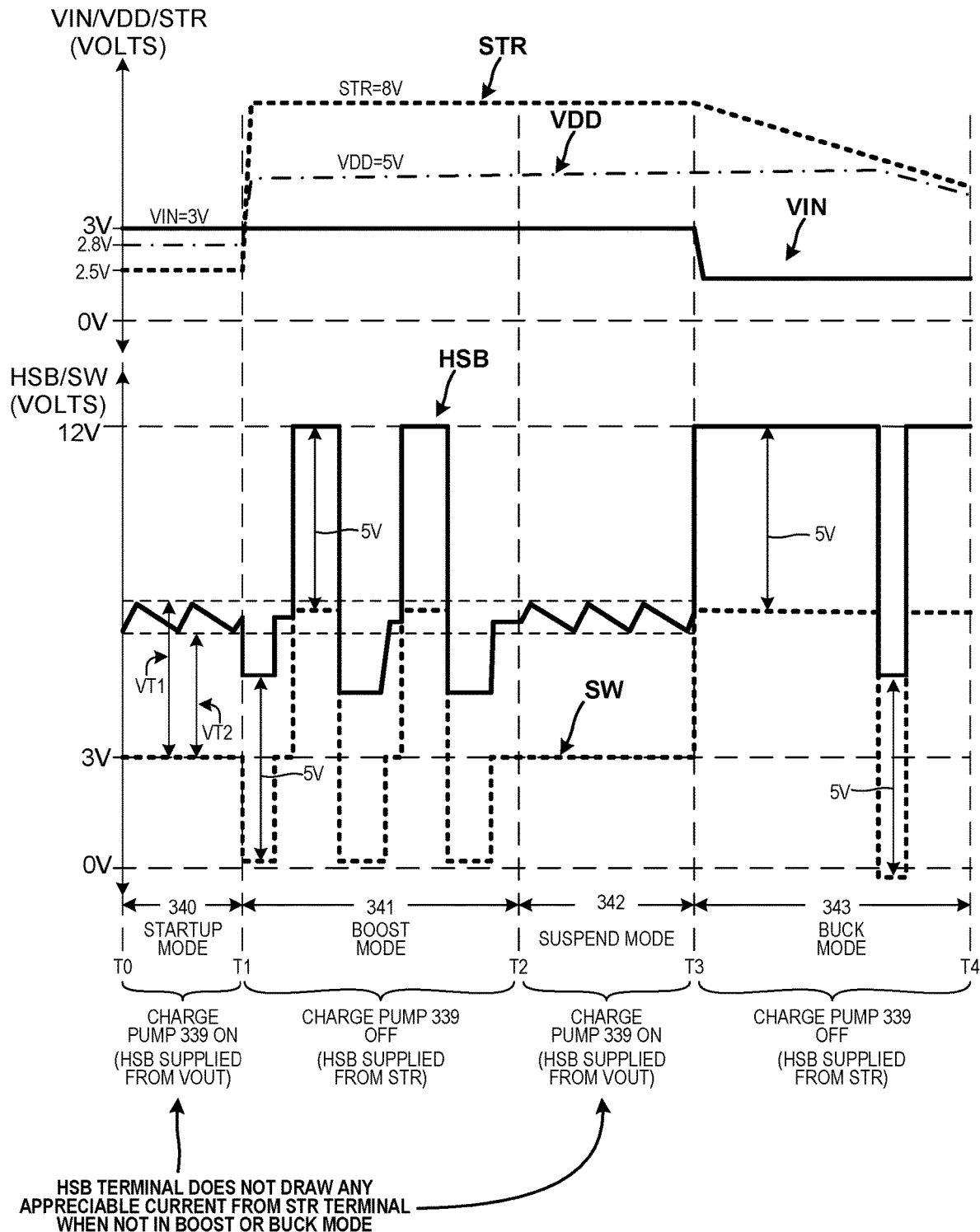
FIG. 18 is a diagram that shows waveforms along various nodes of the integrated circuit 206.

FIG. 18 is a diagram that shows waveforms along various nodes of the integrated circuit 206. Between time T0 and T1, integrated circuit 206 operates in startup mode. Reference numeral 340 identifies the period of time corresponding to startup mode operation. During the startup mode operation, LDO circuit 300 generates VDD supply voltage 303 from the VIN terminal 235. In startup mode operation, voltage 302 on the VIN terminal 235 is 3.0 volts whereas the voltage 301 on the STR terminal 244 is 2.5 volts. Due to the low voltages on the VIN terminal 235 and STR terminal 244, the regulators 306 and 307 of LDO circuit 300 are in dropout mode. After comparator 308 detects voltage 302 on the VIN terminal 235 (3.0 volts) is greater than voltage 301 on the STR terminal 244 (2.5 volts), multiplexer 310 selects VDD supply voltage 303 to be generated from VIN terminal 235. Between T0 and T1, the HSB terminal 252 is maintained to be between VT1 and VT2 above a voltage on SW terminal 253. The HSB terminal 252 does not draw any appreciable current from the STR terminal 244 during the startup mode.

Between time T1 and T2, integrated circuit 206 operates in boost mode 341. Reference numeral 341 identifies the period of time corresponding to boost mode operation. During boost mode operation, LDO circuit 300 generates VDD supply voltage 303 from the STR terminal 244. The gate driver supply voltage 350 is generated by drawing current from capacitor bank 211.

Between time T2 and T3, integrated circuit 206 operates in suspend mode. Reference numeral 342 identifies the period of time corresponding to suspend mode operation. In suspend mode 342, integrated circuit 206 is not operating in either buck or boost mode. The VIN terminal 235 is coupled to the VOUT terminal 263 during the suspend mode. Between T2 and T3, charge pump 339 is activated and maintains the HSB terminal 252 is to be between VT1 and VT2 above a voltage on SW terminal 253. The HSB terminal 252 does not draw any appreciable current from the STR terminal 244 during the suspend mode.

Between time T3 and T4, integrated circuit 206 operates in buck mode. Reference numeral 343 identifies the period of time corresponding to buck mode operation. During buck mode operation, LDO circuit 300 generates VDD supply voltage 303 from the STR terminal 244. The gate driver supply voltage 350 is generated by drawing current from capacitor bank 211. By maintaining the gate drive supply voltage on the HSB terminal 252 to be between VT1 and VT2 above a voltage on SW terminal 253 during the suspend mode, a desirable transient response is obtained at the transition from the suspend mode to the buck mode at time T3.

Figure 19:
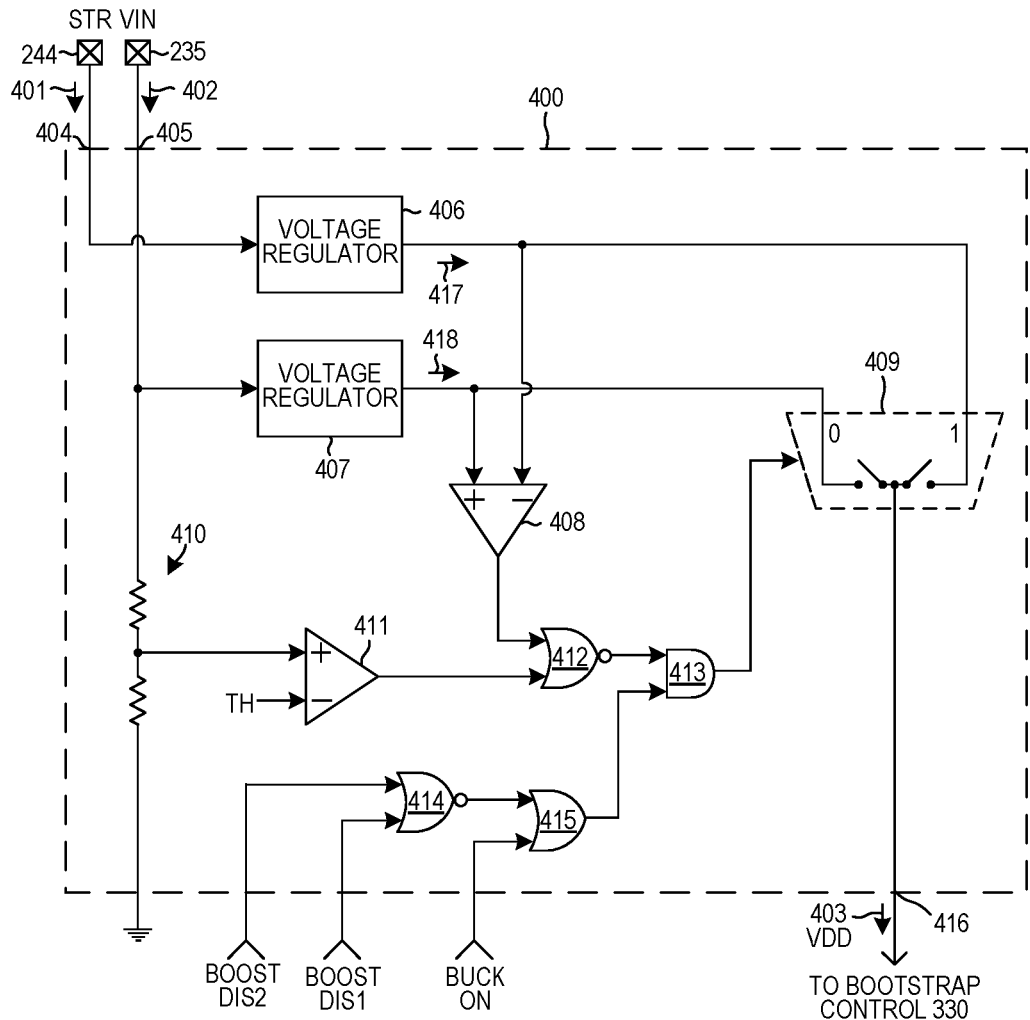
FIG. 19 is a diagram of another embodiment of a linear regulator circuit 400.

FIG. 19 is a diagram of another embodiment of a linear regulator circuit 400. LDO circuit 400 is coupled to receive a voltage 401 from VIN terminal 235 and a voltage 402 on the STR terminal 244. LDO circuit 400 generates and outputs VDD supply voltage 403. LDO circuit 400 comprises a first input lead 404, a second input lead 405, a first voltage regulator 406, a second voltage regulator 407, a first comparator 408, a multiplexer circuit 409, a voltage divider 410, a second comparator 411, a first NOR gate 412, an AND gate 413, a second NOR gate 414, an OR gate 415, and an output terminal 416. LDO circuit 400 generates VDD supply voltage 403 in part by comparing voltage 401 on STR terminal 244 to voltage 402 on VIN terminal 235.

During operation, voltage regulator 306 receives voltage signal 401 from STR terminal 244 and outputs a first regulated voltage 417. The first regulated voltage 417 is supplied to multiplexer 409. Voltage regulator 407 receives voltage signal 402 from VIN terminal 235 and outputs a second regulated voltage 418. The second regulated voltage 318 is supplied to multiplexer 409. The inverting input of first comparator 408 receives the first regulated voltage 417 and the non-inverting input of first comparator 408 receives the second regulated voltage 418. The output of first comparator 408 is supplied to a first lead of first NOR gate 412.

NOR gate 414, OR gate 415, and AND gate 413 ensure that when not operating in buck or boost mode, the VDD supply voltage is generated from VIN terminal 235. Comparator 411 and NOR gate 412 also ensure that if the voltage on the VIN terminal 235 is not above a threshold voltage TH during buck or boost operation, then the VDD supply voltage is generated from the VIN terminal 235.

Figure 20:
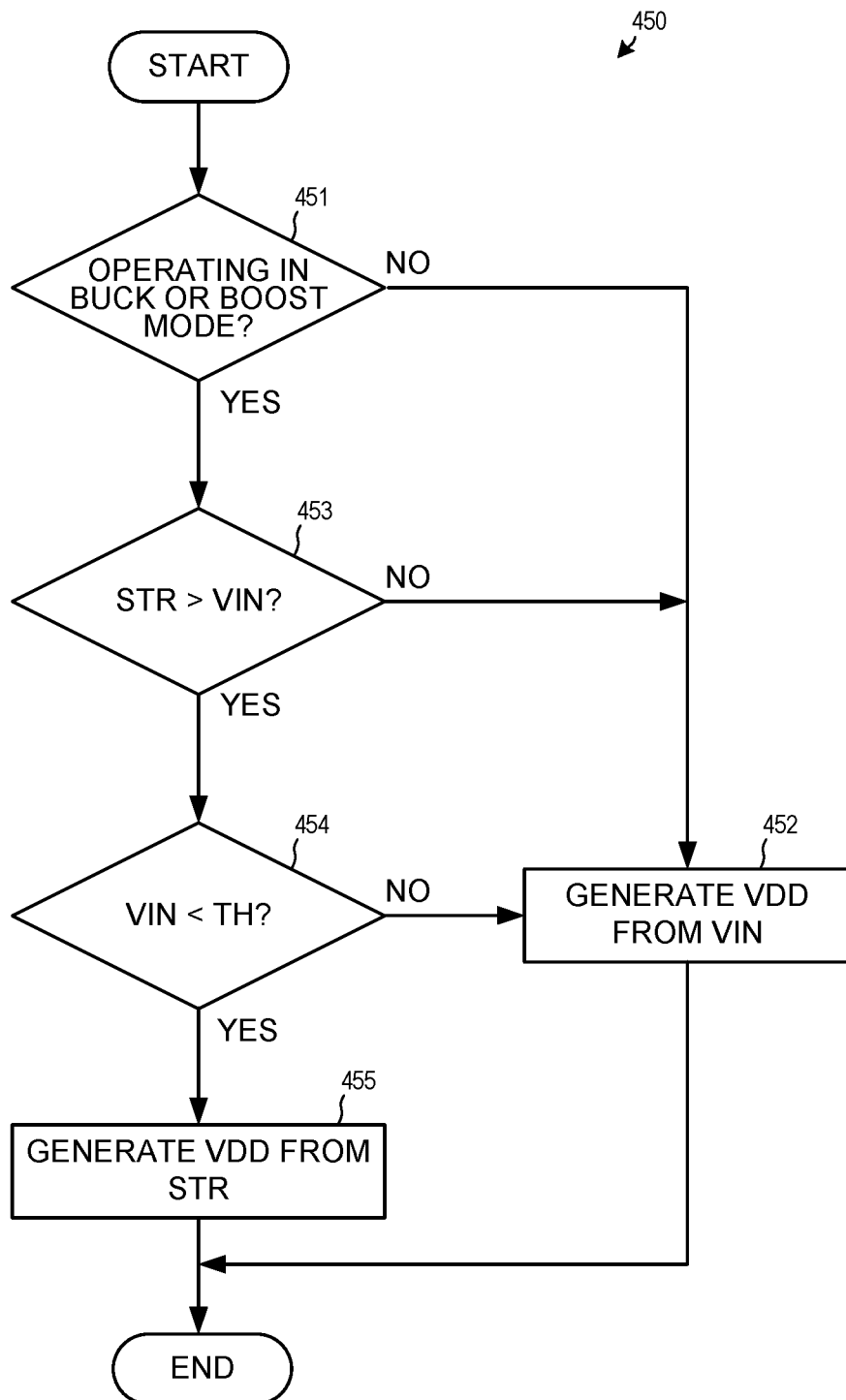
FIG. 20 is a diagram showing operation of the linear regulator circuit 400 of FIG. 19.

FIG. 20 is a diagram showing operation of the linear regulator circuit 400 of FIG. 19. In a first step (step 451), a determination is made as to whether boost mode ore buck mode is enabled. If neither buck nor boost mode is enabled, then the VDD supply voltage is generated from the VIN terminal 235 (step 452).

If, on the other hand, buck or boost mode is enabled, then a determination is made as to whether the voltage on STR terminal 244 is greater than the voltage on VIN terminal 235 (step 453). If the voltage on STR terminal 244 is not greater than the voltage on VIN terminal 235, then the VDD supply voltage is generated from the VIN terminal 235 (step 452). If, on the other hand, the voltage on STR terminal 244 is greater than the voltage on VIN terminal 235, a determination is made as to whether the voltage on VIN terminal 235 is less than a threshold voltage TH (step 454). If the voltage on VIN terminal 235 is not less than a threshold voltage TH, then the VDD supply voltage is generated from the VIN terminal 235 (step 452). If, however, the voltage on VIN terminal 235 is less than a threshold voltage TH, then the VDD supply voltage is generated from the STR terminal 244 (step 455).

Although certain specific embodiments are described above for instructional purposes, the teachings of this patent document have general applicability and are not limited to the specific embodiments described above. For example, although the high side transistor Q1 332 and low side transistor Q2 333 are shown as included within the power loss protection integrated circuit 206, in other embodiments the high side transistor Q1 332 and low side transistor Q2 333 are external to the power loss protection integrated circuit 206 and are not parts of the integrated circuit 206. Accordingly, various modifications, adaptations, and combinations of various features of the described embodiments can be practiced without departing from the scope of the invention as set forth in the claims.

What is claimed is:

1. An integrated circuit comprising:
   a first terminal, wherein the first terminal receives a first voltage generated from a supply voltage source;
   a second terminal, wherein the second terminal receives a second voltage generated from a stored voltage source;
   a third terminal, wherein the third terminal is coupled to a load;
   a fourth terminal, wherein the fourth terminal is capacitively coupled to a terminal of an inductor;
   a regulator circuit having a first node, a second node, and a third node, wherein the first node of the regulator circuit is coupled to the first terminal, wherein the second node of the regulator circuit is coupled to the second terminal;
   a bootstrap control circuit having a first node, a second node, and a third node, wherein the first node of the bootstrap control circuit is coupled to the third node of the regulator circuit, wherein the bootstrap control circuit generates and outputs a gate driver supply voltage onto the second node of the bootstrap control circuit, wherein the third node of the bootstrap control circuit is coupled to the third terminal, and wherein the second node of the bootstrap control circuit is coupled to the fourth terminal; and
   a gate driver circuit, wherein the gate driver circuit receives the gate driver supply voltage on the second node of the bootstrap control circuit, wherein the gate driver circuit drives a gate of a high side transistor and a gate of a low side transistor, wherein when the gate driver circuit is driving the gate of the high side transistor or the gate of the low side transistor, then the gate driver supply voltage is generated from the second voltage, wherein when the gate driver circuit is not driving the gate of the high side transistor or the gate of the low side transistor then the gate driver supply voltage is generated from the first voltage, wherein the regulator circuit is a low drop out (LDO) regulator circuit, and wherein the LDO regulator circuit comprises:
   a first voltage regulator, wherein the first voltage regulator receives the first voltage from the first terminal and outputs a first regulated voltage;
   a second voltage regulator, wherein the second voltage regulator receives the second voltage from the second terminal and outputs a second regulated voltage;
   a comparator having a first input lead and a second input lead, wherein the first input lead receives the first regulated voltage, and wherein the second input lead receives the second regulated voltage; and
   a multiplexer having a first input lead, a second input lead, and an output lead, wherein the first input lead receives the first regulated voltage, wherein the second input lead receives the second regulated voltage, and wherein the multiplexer outputs either the first regulated voltage or second regulated voltage based in part on an output of the comparator.

2. The integrated circuit of claim 1, wherein the integrated circuit is operable in a mode selected from the group consisting of: a boost operating mode, and a buck operating mode.

3. The integrated circuit of claim 2, wherein when the integrated circuit is not operating in either the boost operating mode or the buck operating mode, then the integrated circuit does not draw current from the stored voltage source.

4. The integrated circuit of claim 2, wherein when the gate driver circuit is not operating in either the boost operating mode or the buck operating mode, then the gate driver supply voltage is maintained to be between a first voltage threshold and a second voltage threshold.

5. The integrated circuit of claim 4, wherein when the integrated circuit transitions to operating in the buck operating mode, maintaining the gate drive supply voltage to be between the first voltage threshold and the second voltage threshold provides a desirable transient response.

6. The integrated circuit of claim 1, wherein the stored voltage source is a bank of parallel-connected capacitors, and wherein the supply voltage source is an Alternating Current (AC) source.

7. The integrated circuit of claim 1, wherein the first terminal is a VIN terminal and wherein the third terminal is a VOUT terminal.

8. The integrated circuit of claim 1, wherein the regulator circuit generates a VDD supply voltage by using either the first voltage on the first terminal or the second voltage on the second terminal, and wherein the regulator circuit supplies the generated VDD supply voltage onto the first node of the bootstrap control circuit.

9. The integrated circuit of claim 1, wherein the bootstrap control circuit comprises:
- a first diode having an input lead and an output lead, wherein the input lead of the first diode is coupled to the first node of the bootstrap control circuit, and wherein the output lead of the first diode is coupled to the second node of the bootstrap control circuit;
- a charge pump circuit having an input lead and an output lead, wherein the input lead of the charge pump circuit is coupled to the third node of the bootstrap control circuit; and
- a second diode having an input lead and an output lead, wherein the input lead of the second diode is coupled to the output lead of the charge pump circuit, and wherein the output lead of the second diode is coupled to the second node of the bootstrap control circuit.

10. The integrated circuit of claim 9, wherein the bootstrap control circuit further comprises:
- a charge pump control circuit, wherein the charge pump control circuit generates and supplies a charge pump control signal CPEN onto the charge pump circuit, wherein the charge pump control signal CPEN is generated based in part on a voltage on the fourth terminal and a voltage on a fifth terminal of the integrated circuit, and wherein the fifth terminal of the integrated circuit is coupled to the terminal of the inductor.

11. A method, comprising:
(a) generating a VDD supply voltage from either an AC voltage source or a stored voltage source, wherein the VDD supply voltage is generated by a low drop out (LDO) regulator circuit, wherein the VDD supply voltage is supplied onto a first node of a bootstrap control circuit, wherein the regulator circuit and the bootstrap control circuit are parts of an integrated circuit, and wherein generating the VDD supply voltage comprises:
- receiving, at a first voltage regulator, a first voltage from the AC voltage source and outputting a first regulated voltage;
- receiving, at a second voltage regulator, a second voltage from the stored voltage source and outputting a second regulated voltage;
- comparing, at a comparator, the first regulated voltage and the second regulated voltage; and
- multiplexing, at a multiplexer, the first regulated voltage and the second regulated voltage and outputting either the first regulated voltage or second regulated voltage as the VDD supply voltage based in part on an output of the comparator;

(b) generating a gate driver supply voltage, wherein the gate driver supply voltage is generated by the bootstrap control circuit, wherein the bootstrap control circuit has a first node coupled to receive the VDD supply voltage, and wherein the gate driver supply voltage is supplied onto a second node of the bootstrap control circuit; and (c) driving a high side transistor or a low side transistor using the gate driver supply voltage generated in (b), wherein when the high side transistor or the low side transistor are being driven, then the gate driver supply voltage is generated using the stored voltage source, and wherein when the high side transistor or the low side transistor are not being driven, then the gate driver supply voltage is generated using the AC voltage source.

12. The method of claim 11, wherein whether the VDD supply voltage is generated from either the AC voltage source or the stored voltage source is based in part on a first voltage present at a first terminal of the integrated circuit and a second voltage present on a second terminal of the integrated circuit.

13. The method of claim 12, wherein the bootstrap control circuit has a third node coupled to a third terminal of the integrated circuit, wherein the third terminal of the integrated circuit is coupled to a load, and wherein the gate driver supply voltage is also supplied to a fourth terminal of the integrated circuit.

14. The method of claim 13, wherein the first terminal of the integrated circuit is a VIN terminal and wherein the third terminal of the integrated circuit is a VOUT terminal.

15. The method of claim 11, further comprising:
(d) maintaining the gate driver supply voltage to be between a first voltage threshold and a second voltage threshold when neither the high side transistor nor the low side transistor is being driven.

* * * * *